US008221212B2

(12) United States Patent
Katz et al.

(10) Patent No.: US 8,221,212 B2
(45) Date of Patent: Jul. 17, 2012

(54) SIDE GAME RESULT GENERATOR

(75) Inventors: George Peter Katz, Allambie Heights (AU); Chi We Chim, Beecroft (AU); Gary Simon Good, Winston Hills (AU); Rick Tinschert, North Sydney (AU)

(73) Assignee: NextGen Gaming Pty Ltd, North Sydney, New South Wales (AU)

( * ) Notice: Subject to any disclaimer, the term of this patent is extended or adjusted under 35 U.S.C. 154(b) by 250 days.

(21) Appl. No.: 12/593,990

(22) PCT Filed: Mar. 19, 2008

(86) PCT No.: PCT/AU2008/000396

§ 371 (c)(1),
(2), (4) Date: Mar. 29, 2010

(87) PCT Pub. No.: WO2008/119105

PCT Pub. Date: Oct. 9, 2008

(65) Prior Publication Data

US 2010/0178979 A1 Jul. 15, 2010

(30) Foreign Application Priority Data

Apr. 2, 2007 (AU) ................................ 2007901744

(51) Int. Cl.
*A63F 13/00* (2006.01)

(52) U.S. Cl. ........................................................ 463/17

(58) Field of Classification Search ..................... 463/17
See application file for complete search history.

(56) References Cited

U.S. PATENT DOCUMENTS

2001/0035610 A1 11/2001 Webb
2003/0008697 A1 1/2003 Hartl
2005/0020347 A1 1/2005 Moshal
2005/0023758 A1 2/2005 Noyes
2005/0253334 A1 11/2005 Friedman
2005/0253338 A1 11/2005 Daines

OTHER PUBLICATIONS

An Australian Examiner's First Report for Application No. 2008234403, dated Dec. 22, 2011, 3 pages.
International Search Report from PCT/AU2008/000396, dated May 7, 2008 (4 pages).

*Primary Examiner* — Peter DungBa Vo
*Assistant Examiner* — Jeffrey Wong
(74) *Attorney, Agent, or Firm* — Kilpatrick Townsend & Stockton LLP

(57) ABSTRACT

A computer implemented method of playing a wagering game is disclosed. A base game bet is placed on a base game, results of the base game being resolved according to a first set of game rules. In the method, a side game bet is placed on a side game while participating in the base game. One or more of the results of the base game are used as inputs to the side game, with results of the side game being resolved based on the inputs according to a second set of game rules.

12 Claims, 18 Drawing Sheets

SIDE GAME RESULT GENERATOR

CROSS REFERENCE TO RELATED APPLICATIONS

This application is the U.S. National Stage entry of International Application No. PCT/AU2008/000396, filed Mar. 19, 2008, which claims benefit of Australian Application No. 2007901744, filed Apr. 2, 2007, the contents of each are incorporated herein by reference in their entirety.

FIELD OF THE INVENTION

The present invention relates generally to a gaming system and, in particular, to a side game for a base game being played on a gaming system.

BACKGROUND

Table wagering games, such as poker, craps, blackjack, roulette and baccarat, played both on land-based gaming machines and online, are extremely popular. Every year substantial amounts of money are gambled on such games. However, technological advances in the delivery of content for games, means that players of such games are becoming increasingly discerning as to the presentation of the games. Players expect to be excited by new features and by more appealing presentations of traditional features in games.

As a result, developers of games for gaming systems are forced to develop new and innovative features in order to keep existing players interested in the games and in order to attract new players to the games.

One known feature is known as a "side bet". A side bet is a wager made beyond the normal rules of the base game. Side bets can involve any topic, such as a bet on a football game occurring at the same time as a poker game. Side bets can also be made on side games such as a blackjack side game being played with a poker base game. The addition of side bets and side games to table games played both on land-based gaming machines and online has provided an additional level of interest to players and has increased rewards to be made to the players. However, traditionally side games have only been offered to players that are waiting to play or have finished playing a base game (e.g., folded in a poker game).

SUMMARY

According to one aspect of the present invention there is provided a computer implemented method of playing a wagering game comprising the steps of:

placing a base game bet on a base game and participating in said base game, results of said base game being resolved according to a first set of game rules; and placing a side game bet on a side game while participating in said base game, one or more of the results of said base game being used as inputs to said side game, results of said side game being resolved based on said inputs according to a second set of game rules.

According to another aspect of the present invention there is provided a gaming system for playing a game comprising a base game and a side game, said gaming system comprising:

a processor for controlling the play of the base game and the side game;

at least one display device connected to the processor for displaying one or more screens of the base game and the side game; and input means connected to the processor and the display device, for use by a player in controlling one or more aspects of the games, wherein the processor controls the base game such one or more results of the base game are used as input results of the side game.

According to still another aspect of the present invention there is provided a computer implemented method of gaming using a gaming system comprising a processor for controlling the play of a base game and a side game, at least one display device connected for displaying one or more screens of the base game and the side game, and input means for enabling a player to control one or more aspects of the base game and the side game, said method comprising the steps of:

executing said base game and displaying one or more results of said base game on said display device, upon receiving a signal via the input means;

executing said side game, wherein one or more results of the base game are used as input results of the side game; and paying a prize for the side game upon the results of the side game meeting predetermined criteria, the prize in the side game being separate to any prize payed in the base game.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1A:
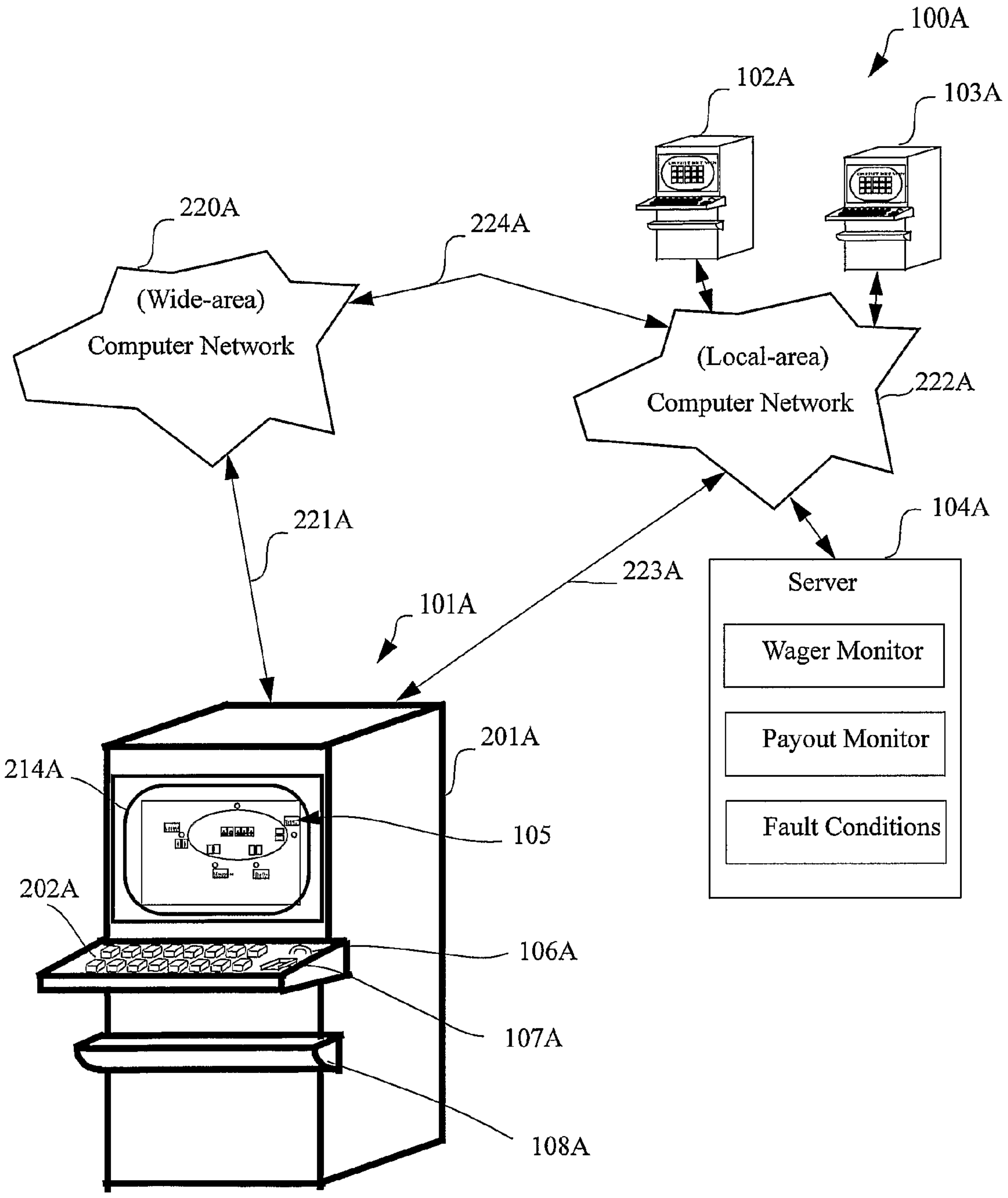
FIG. 1A is a schematic block diagram of a gaming system upon which the arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

FIG. 1A shows a gaming system 100A including a gaming machine 101A for use by a player in playing a game. The gaming machine 101A comprises an enclosure 201A having display means in the form of a video display device 214A for displaying to the player one or more graphics screens (e.g., 105) for the game being played on the gaming machine 101A. The enclosure 201A also has an input device in the form of a keypad 202A comprising one or more buttons for use by the player in controlling one or more aspects of the game.

Credit input means in the form of a coin input device 106A and a note input device 107A, are also included in the enclosure 201A, to allow the player to input credit in order to play the game. A coin tray 108A is also typically incorporated in the enclosure 201A in order to allow cash payouts to be payed to the player.

In the gaming system 100A, the gaming machine 101A is connected to a communications network 222A, known as a Local Area Network (LAN), via a connection 223A. Alternatively, the gaming machine 101A may be standalone. As shown in FIG. 1A, the LAN 222A is coupled to a wide-area network (WAN) 220A, such as the Internet or a private WAN, via a connection 224A. The gaming machine 101A may also be coupled directly to the WAN 220A via a connection 221A.

The network 222A comprises one or more further gaming machines 102A and 103A connected thereto. The further gaming machines are generally similar to the gaming machine 101A but may be configured to implement the same or different games. The further gaming machines may also be connected to the network 220A.

A server computer 104A, used for monitoring the gaming machine 101A, is also connected to the network 222A. The server 104A may be used for monitoring the amount of money wagered (or bet) on the gaming machine 101A over a period of time, the amount of money payed out on the gaming machine 101A over a period of time and any fault conditions on the gamine machine 101A. The server 104A may also be configured to disable or enable the gaming machine 101A.

The gaming machine 101A will be described in more detail below with reference to FIG. 2.

Figure 1B:
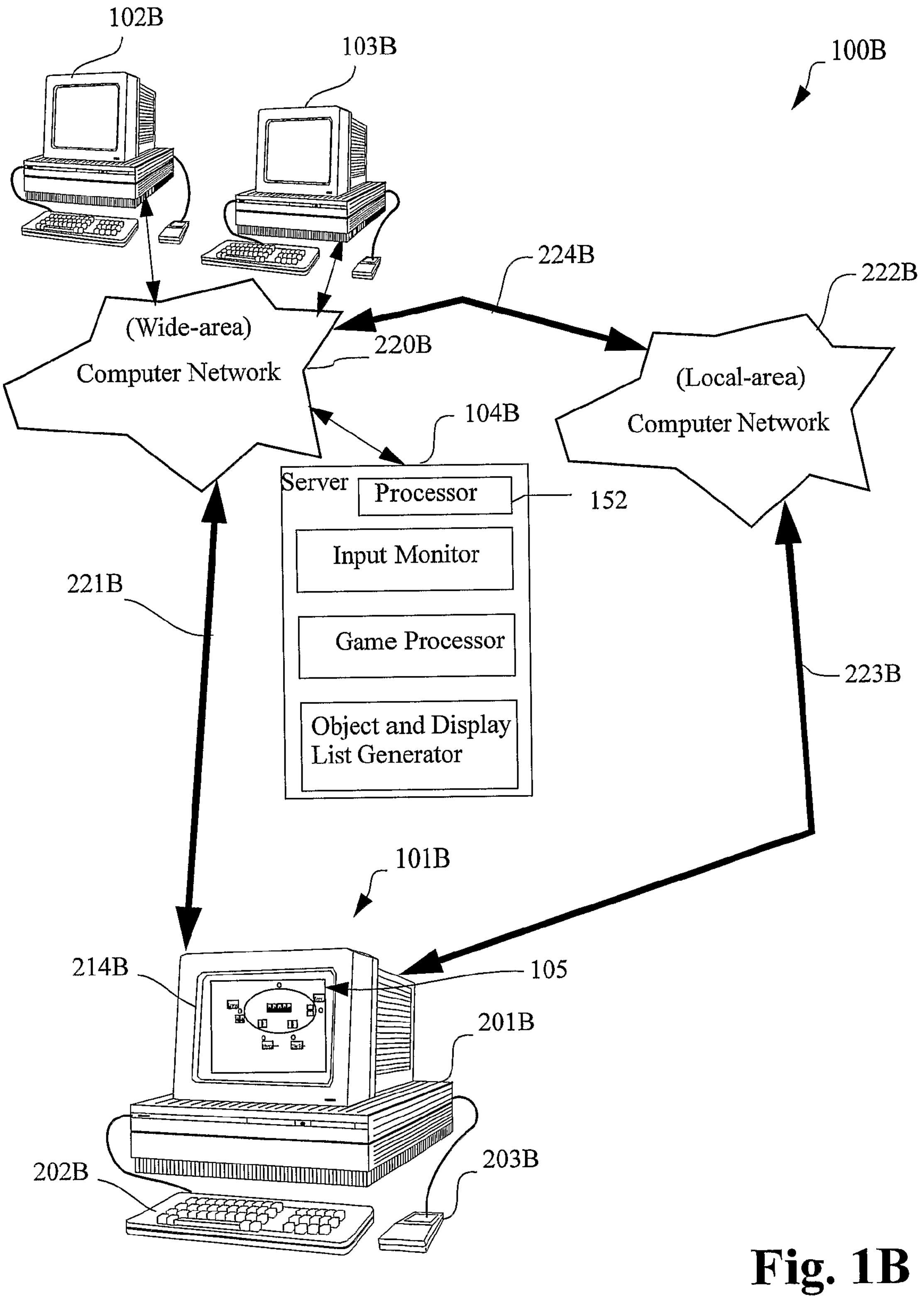
FIG. 1B is a schematic block diagram of another gaming system upon which the arrangements described can be practiced.

FIG. 1B shows another gaming system 100B. The gaming system 100B comprises a stand-alone "personal" computer 101B for use by a player for playing a game. The personal computer 101B may be an IBM-PC or compatible, a Sun Sparcstation, an Apple Mac™, or one of a like computer system evolved therefrom including desktop, laptop, notebook or handheld variations thereof. As seen in FIG. 1B, the computer 101B comprises an enclosure 201B and a display means in the form of a video display device 214B for displaying screens, such as the screen 105 of the game being played. The computer 101B also comprises an input device in the form of a keyboard 202B comprising one or more buttons for use by the player in playing the game. The input means for the computer 101B also comprises a mouse pointer device 203B.

The computer 101B may be connected to a local area network (LAN) 222B, via a connection 223B. The LAN 222B may couple to a wide area network (WAN) 220B, such as the Internet or a private WAN, via a connection 224B. The computer 101B is also shown coupled directly to the WAN 220B, via a connection 221B. In the system 100B, the WAN 220B typically comprises one or more further computers 102B and 103B, similar to the computer 101B, connected thereto, and which may be used by other persons for game playing. Further such computers may also be connected to the LAN 222A.

A remote server 104B is also connected to the WAN 220B. However, in contrast to the server 104A of the system 100A, a processor 152 of the server 104B of the system 100B may be used to control the execution of one or more games being played on the gaming system 100B. For example, the processor 152 of the server 104B may download one or more graphic objects to the computer 101B for the game being played by the corresponding player, together with a display list for displaying the downloaded graphic objects for one or more screens (e.g., 105) of the game being played on the computer 101B. In this instance, the server 104B then controls the game by downloading further display lists to the computer 101B as the game is being played by the player and being executed by the computer 101B.

In the system 100B, rather than credit input means in the form of the coin input device 106A and the note collector 107A, the player inputs credit in order to play the game by creating an account with a provider of the game, who may or may not be the administrator of the server 104B. For example, the player may provide their credit card and contact details to the game provider via the computer 101B and the network 220B. In this instance, as the player plays the game on the computer 101B, the player's account is debited and credited according to how the player bets and wins, respectively.

The computer 101B will now be described in more detail below with reference to FIG. 2.

The gaming machine 101A and the computer 101B have similar computer hardware architecture. Accordingly, unless referred to specifically, the gaming machine 101A and the computer 101B will be hereinafter generically referred to as the "gaming device" 101. Similarly, components of the gaming machine 101A and the computer 101B, such as the enclosures 201A and 201B, and the displays 214A and 214B, respectively, will be hereinafter generically referred to as the enclosure 201 and the display 214, respectively, of the gaming device 101, unless such components are referred to specifically. Further, other components, such as the WANs 220A, 220B, and the LANs 222A and 222B, for example, will be hereinafter generically referred to as the WAN 220 and the LAN 222. Finally, unless referred to specifically, the gaming systems 100A and 100B will be hereinafter generically referred to as the gaming system 100.

The game played on either of the gaming systems 100A or 100B may be implemented as software, such as one or more application programs being executable by the gaming system 100. In particular, the game may be effected by instructions in the software that are carried out by the gaming system 100. The instructions may be formed as one or more code modules, each for performing one or more particular tasks. As will be described in detail below, the software may also be divided into separate parts, in which a one or more parts and the corresponding code modules performs the game and one or more other parts and the corresponding code modules manage a user interface between the first part and the player of the game. For example, as seen in FIGS. 1A and 1B, the user interface may be formed by one or more screens such as the screen 105.

The software may be stored in a computer readable medium, including the storage devices described below, for example. The software may be loaded into the gaming system

100 from the computer readable medium, and may then be executed by the gaming system 100. A computer readable medium having such software or computer program recorded on it is a computer program product. The use of the computer program product in the gaming system 100 preferably effects an advantageous apparatus for implementing the game described herein.

Figure 2:
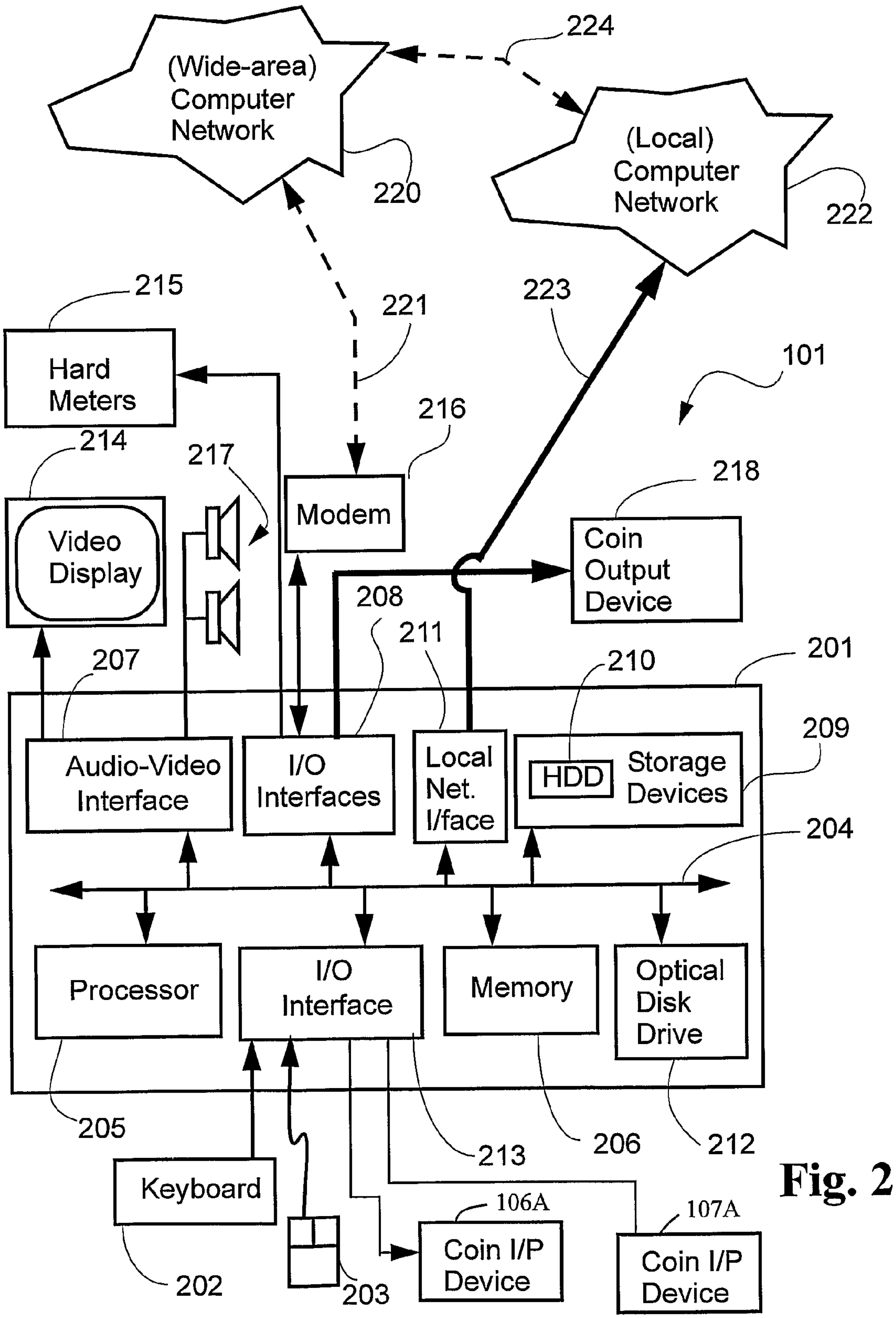
FIG. 2 is a schematic block diagram of a gaming apparatus used in the gaming systems of FIGS. 1A and 1B.

As seen in FIG. 2, the gaming device 101 comprises an input device 202. The input device 202 is formed by the keypad 202A when the gaming device 101 is the gaming machine 101A or by the keyboard 202B when the gaming device 101 is the computer 101B. The computer 101B also comprises the mouse pointer device 203. The gaming device 101 also comprises output devices including the display device 214 and loudspeakers 217. In one configuration, the display device 214 may be a touch screen.

When the gaming device 101 is the gaming machine 101A, the gaming device 101 also comprises the coin input device 106A and the note input device 107A, as well as a coin output device 218, as seen in FIG. 2.

An external Modulator-Demodulator (Modem) transceiver device 216 may be used by the gaming device 101 for communicating to and from the communications network 220 via the connection 221. Where the connection 221 is a telephone line, the modem 216 may be a traditional "dial-up" modem. Alternatively, where the connection 221 is a high capacity (eg: cable) connection, the modem 216 may be a broadband modem. A wireless modem may also be used for wireless connection to the network 220.

The gaming device 101 typically comprises at least one processor unit 205 for controlling at least partial execution of the game on the gaming system 100. The processor unit 205 may be formed by a micro-controller, micro-processor, programmable logic device or the like. The gaming device 101 also comprises a memory unit 206, for example, formed from semiconductor random access memory (RAM) and read only memory (ROM). A number of input/output (I/O) interfaces including an audio-video interface 207 that couples to the video display 214 and loudspeakers 217, are typically also included. The gaming device 101 also comprises an I/O interface 213 for the input device 202, and when the gaming device 101 is the gaming machine 101A, the coin input device 106A and the note input device 107A, as seen in FIG. 2. The interface 213 is also used for the mouse 203 when the gaming device 101 is the computer 101B.

The gaming device 101 may also comprise or be connected to an interface 208 used for the external modem 216. The interface 208 may be used for a coin output device 218, when the gaming device 101 is the gaming machines 101A. In some implementations, the modem 216 may be incorporated within the gaming device 101, for example within the interface 208. The gaming device 101 also has a local network interface 211 which, via the connection 223, permits coupling of the gaming device 101 to the LAN 222. As also shown in FIG. 2, the LAN 222 couples to the wide network 220 via the connection 224 and would typically include a so-called "firewall" device or similar functionality. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (eg: CD-ROM, DVD), USB-RAM, and floppy disks for example may then be used as appropriate sources of data to the gaming system 100.

The gaming device 101 may also comprise one or more hard meters 215, which are required by some regulatory authorities. These hard meters 215 determine a cumulative number of credits input by a player of the gaming device 101 and output by the gaming device 101 throughout the life of the gaming device 101. The meters 215 are typically set to "zero" when the gaming device 101 is first configured.

The components 205 to 213 of the gaming device 101 typically communicate via an interconnected bus 204 and in a manner which results in a conventional mode of operation of the gaming device 101 known to those in the relevant art.

Figure 3:
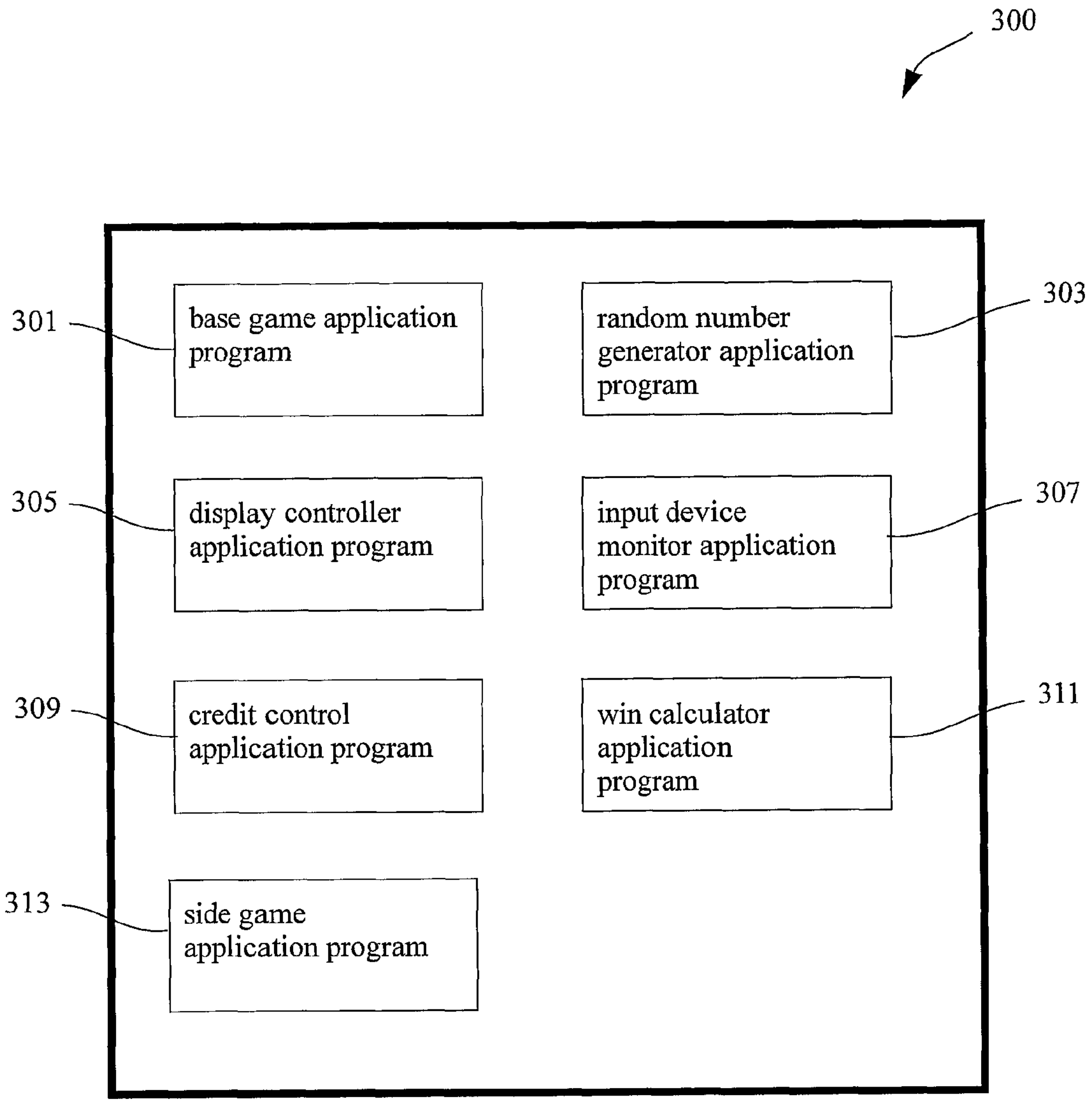
FIG. 3 is a representation of the software architecture of the gaming systems of FIGS. 1A and 1B.

FIG. 3 is a representation of the software architecture 300 of the gaming system 100. The software architecture 300 comprises a base game application program 301, which controls the game being played on the gaming system 100. This game will be hereinafter referred to as the "base game". Another of the application programs of the software architecture 300 is a random number generator 303, as known to those in the relevant art, which may be used in determining the outcomes of the base game being played on the gaming system 100. A display controller application program 305 is included to implement one or more of the screens (e.g., 105) to be rendered or otherwise represented upon the display 214 for the base game and any other games, such as side games being played on the gaming device 101.

The software architecture 300 may also comprise an input device monitor application program 307 for monitoring signals from the input device 202 (and possibly the mouse 203) of the gaming device 101. For example, the input device monitor application program 307 monitors the manipulation of the input device 202 or the mouse 203 by the player of the base game in order to provide controlling commands to the base game application program 301 and any other games being played on the gaming device 101.

A credit control application program 309 is also included in the software architecture 300 for crediting or deducting any winning or losing amount from the credits of a player depending on the outcomes of the base game and any other game being played by the player. This winning or losing amount is determined by a win calculator application program 311 using a pay table. This pay table may be stored on the hard disk drive 210, for example.

For land-based gaming machines such as the gaming machine 101A, the amount of money that each credit is worth is typically dictated by the gaming machine 101A. For example, each credit may be worth one cent (1¢), five cents (5¢) or one dollar ($1) depending on the gaming machine. The amount of money that each credit is worth may be referred to as the "denomination". The denomination will determine the amount that can be bet on each game, as will be described below. The input device 202A of the gaming machine 101A may include buttons for use in increasing the amount that can be bet on each game. For example, the input device 202A may include a "2×" button (not shown) for doubling the denomination, a "5×" button (not shown) for multiplying the denomination by five and/or a "10×" button (not shown) for multiplying the denomination by ten.

For online gaming using the gaming system 100B, for example, the player may select a denomination (e.g., one cent (1¢), five cents (5¢), one dollar ($1) etc) using the input device 202B and the mouse 203B, for example. In one example, the player may use the mouse 203B to select a denomination or the amount that they wish to bet by selecting a denomination symbol displayed in a screen of the base game on the display 214B. Again, this selected denomination will determine the amount that can be bet on each game, as will be described below.

The software architecture 300 of the gaming system 100 may also include a side game application program 313 implementing a side game of the base game.

Typically, the application programs 301 to 313 discussed above are resident on the hard disk drive 210 and are read and controlled in their execution by the processor 205. However, in the gaming system 100B, the application programs 301 to 313 may be resident on a hard disk drive of the server 104B and be controlled in their execution by a processor 152 of that server 104B, with the processor 152 being configured to download one or more graphic objects for the game to the computer 101B together with one or more display lists for displaying the downloaded graphic objects as one or more screens (e.g., 105) of the base game and any other side game being played on the gaming system 100B.

Intermediate storage of the application programs 301 to 313 and any data fetched from the networks 220 and 222 may be accomplished using the semiconductor memory 206, possibly in concert with the hard disk drive 210. In some instances, the application programs may be supplied to a game provider (e.g., an operator of the gaming machine 101 or administrator of the server 104B) encoded on one or more CD-ROMs and be read via the corresponding drive 212, or alternatively may be read by the user from the networks 220 or 222. Still further, the software may also be loaded into the gaming system 100 from other computer readable media. Computer readable media refers to any storage medium that participates in providing instructions and/or data to the gaming system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the enclosure 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

In some arrangements described below, the base game is a poker game. The poker base game is typically played on the gaming system 100B, where each player plays the poker base game on a different computer (e.g., 102B and 103B) connected to the network 220B, and this will assumed to be the case below. In this instance, the application programs 301 to 313 are resident on a hard disk drive of the server 104B and are controlled in their execution by the processor 152 of that server 104B. The processor 152 is configured to download one or more graphic objects for the poker base game and any side game to the computer 101B together with one or more display lists for displaying the downloaded graphic objects as one or more screens (e.g., 105) of the base game and any side game being played on the gaming system 100B.

However, the poker base game may also be played on the gaming system 100A where each player has a different display screen.

Each hand of the poker base game will be referred to hereinafter as a 'game'. The poker base game described herein is "Texas holdem poker". However, the base game may be any form of poker. The results of the poker base game are resolved according to a set of rules.

Figure 5:
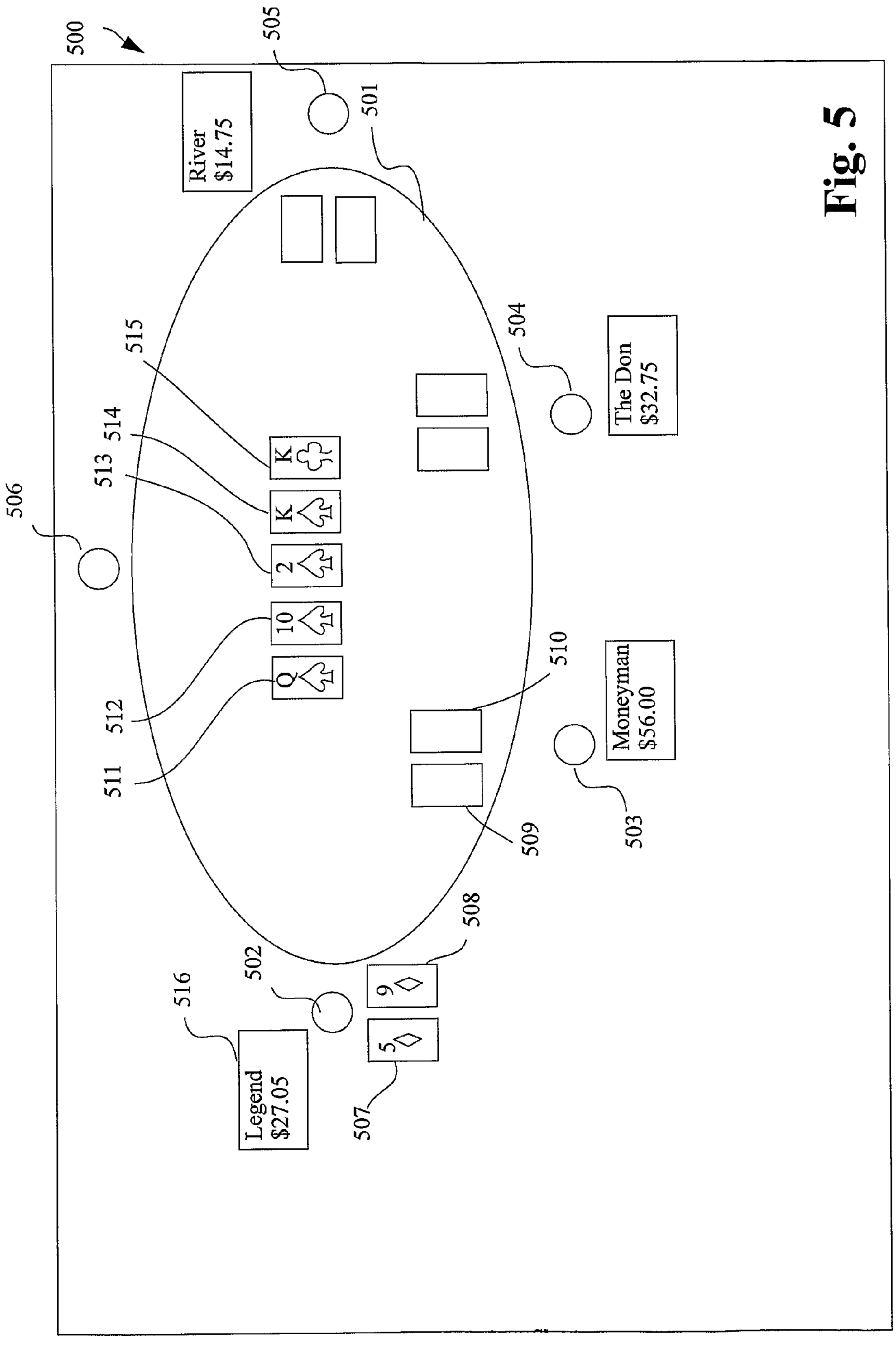
FIG. 5 shows a display screen presentation of a poker base game.

A screen 500 of the poker base game, as represented on the display device 214B by the display control application program 305, is shown in FIG. 5. The screen 500 comprises a representation of a table 501, a representation 502 to 505 of each player and a representation 506 of a dealer. In the described example, the representation 502 is being controlled by a player using the computer 101B of the gaming system 100B. The representation 502 will be referred to as the "player 502." Similarly, the representations 503 to 505 are being controlled by other players using other computers (e.g., 102B and 103B) connected to the network 220B. These other players will be referred respectively as the players 503 to 505.

At the start of the Texas holdem poker base game, there are two forced bets called "blinds". The poker base game begins with the two players 504, 505 to the left of the dealer 506 putting a predetermined amount of money (i.e., the blinds) into the pot before any cards are dealt, thus ensuring that there is something to play for on every hand. Most often, the player 505 on the immediate left of the dealer 506, referred to as the small blind, puts up half the minimum bet, and the player 504 on his left, referred to as the big blind, puts up the full minimum bet. This process is called "posting the blinds." The processor 152 may request each of the players 504 and 505 to place these bets using the display screen 314B.

The bets by the players 502 to 505 may be placed using an input device (e.g., 202B and/or a mouse pointer device (e.g., 203B). The amount of the bet placed by the player 502 is typically determined by the credit control application program 309 being controlled in its execution by the processor 152 typically examining player input via the input device 202B. Similarly, the amount of the bets placed by the other players 503 to 505 are typically determined by the input device monitor application program 307 examining player input via the input devices of the computers that those other players 503 to 505 are using to play the game.

Each player 502 to 505 is dealt two cards (e.g., 507, 508, 509, 510), referred to as the hole cards, face down on the table 501. However, as seen in FIG. 5, the cards 507, 508 dealt to the player 502 being controlled by the player using the computer 101B, are displayed on the display device 214B so that the player 502 can see the denomination of the cards 507 and 508. Similarly, each of the other player's (i.e., players 503 to 505) hole cards are displayed to the corresponding players 503 to 505 on their corresponding display devices.

The object of the poker base game for each player is to combine the two hole cards with five cards which will eventually be laid out in front of the dealer 506 ("the board") to make the best poker hand among the players 502 to 505. This hand may consist of the two hole cards and three of the board, one hole card and four of the board or neither of the hole cards and just the board. The holder of the best poker hand wins the game and the accumulation of all bets (i.e., the pot). The amount of the pot may be determined by the win calculator application program 311 as each player makes their bets.

A first round of betting takes place immediately after the deal of each of the hole cards (e.g., 507 and 508). The first player to bet is the player 503 to the left of the big blind (i.e., the player 504 in the present example). The player 503 on the immediate left of the player 504 (i.e., the big blind) has three options: call, raise or fold. Again, the option may be selected by the player 503 using an input device and/or a mouse pointer device on their computer. To call, the player 503 places a bet that is equal to the big blind. To raise, the player 503 adds an additional amount to the pot. The size of this amount varies with the type of game being played. In "limit games", the additional amount is a fixed amount and may be capped (limited) after a set number of rounds (normally four rounds). In "pot limit games" the additional amount cannot be larger than the amount currently in the pot. In "no limit games", the additional amount may be any amount, limited only by the amount of money that the player has to play with.

If the player 503 chooses to fold, using the input device and/or mouse pointer device, the player's cards 509 and 510 constitute "muck". The player that folded can take no further part in the current hand of the poker base game and any bets the player has made in relation to the base game are forfeit. Subsequent players 502, 504 and 505 have the same three options, plus the option to reraise (or rereraise). A reraise must equal at least the size of the last raise.

After the first betting round, the dealer 506 places the next three cards 511, 512 and 513 face up on the table 501, as seen in FIG. 5. These three cards 511, 512 and 513 are called "the flop." Accordingly, the screen 500 is updated on each of the computers (e.g., 101B, 102B and 103B) being used by the players 502 to 505 to show the cards 511, 512 and 513. The screen 500 is updated by the display controller application program 305 in conjunction with the base game application program 301 being executed by the processor 152 of the server 104B. The denomination of the cards 511, 512 and 513 is determined by the base game application program 301.

The second betting round and all subsequent betting rounds start with the first player to the dealer's left still in the hand. In addition to calling, raising or re-raising, players now have the option to check—staying in the hand without betting until it is their turn to bet again.

Once a bet has been made, a player may choose to call for that amount or raise (or reraise, where applicable). If the player chooses to do neither, the player must fold. Thus, at the end of the round, all players will have put in an equal amount of bets except where a player has an inadequate amount of funds; in that case, the player may go all-in betting the total amount of money that the player has to play with and one or more side pots are established, limiting the amount that the player may win to an accumulation of equal amounts from the main pot from players who contributed to that pot. Again, the amount of the pots and the side pots are determined by the win calculator application program 311.

After the completion of the second betting round the next card 514 exposed and added to the board as seen in FIG. 5. This card 514 is referred to as the "turn" card. Again, the denomination of the card 514 is determined by the base game application program 301 and the screen 500 is updated on each of the computers (e.g., 101B, 102B and 103B) by the display controller application program 304 being executed by the processor 152 of the server 104B to show the card 514.

After the completion of the third betting round, the fifth and final community card 515 is exposed and added to the board. This fifth card 515 is referred to as the "river" card. Again, the denomination of the card 515 is determined by the base game application program 301. Further, the screen 500 is updated on each of the computers being used by the players 502 to 505 to show the card 515.

A fourth round of betting precedes the "show-down", when the players must reveal their cards. When the players (e.g., 503) reveal their cards, the screen 500 is updated by the display control application program 305 on the display screens of each of the computers (e.g., 101B, 102B and 103B) being used by the players 502 to 505 to show the cards to each of the players.

If two or more players have the same hand, the next highest card in the player's hand, referred to as "the Kicker", is used to break the tie. If there is no kicker card, the tied players have used both hole cards, or have the same hand, the pot is split between them.

The amount paid to each of the players 502 to 505 is determined by the win calculator application program 311 based on the size of the pot.

The screen 500 also comprises a credit meter (e.g., 516) associated with each of the players 502 to 505 indicating a total amount of money that the player has remaining to play the poker base game. Upon a bet being placed by the player 502, for example, the credit control application program 309 updates the credit meter 516 to reflect the amount of the bet. Similarly, at the end of a hand, the credit control application program 309 in conjunction with the win calculator application program 311 updates the credit meters to reflect the amounts won by each of the players.

Figure 6:
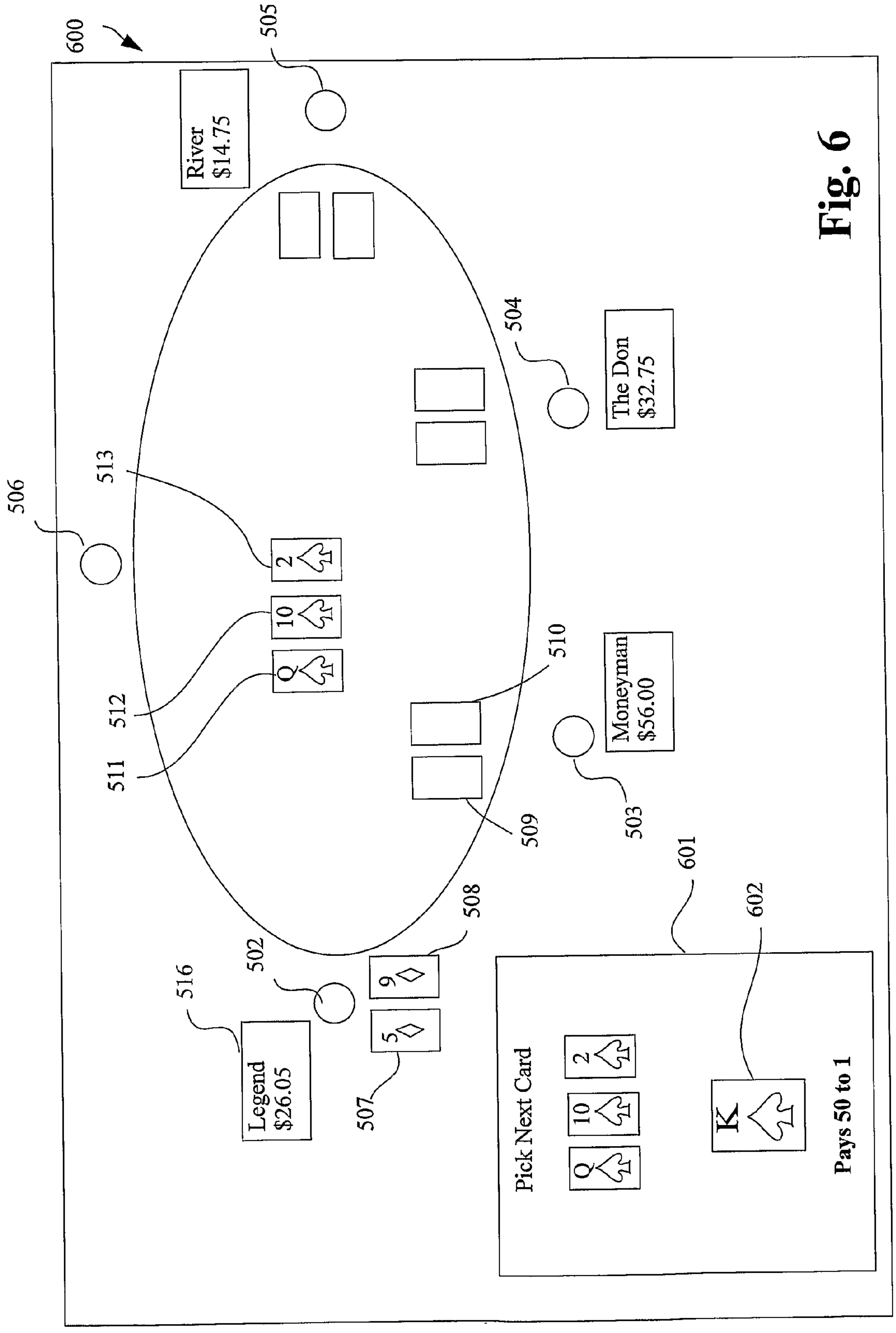
FIG. 6 shows a display screen presentation of the poker base game and the pick a card side game.
Figure 7:
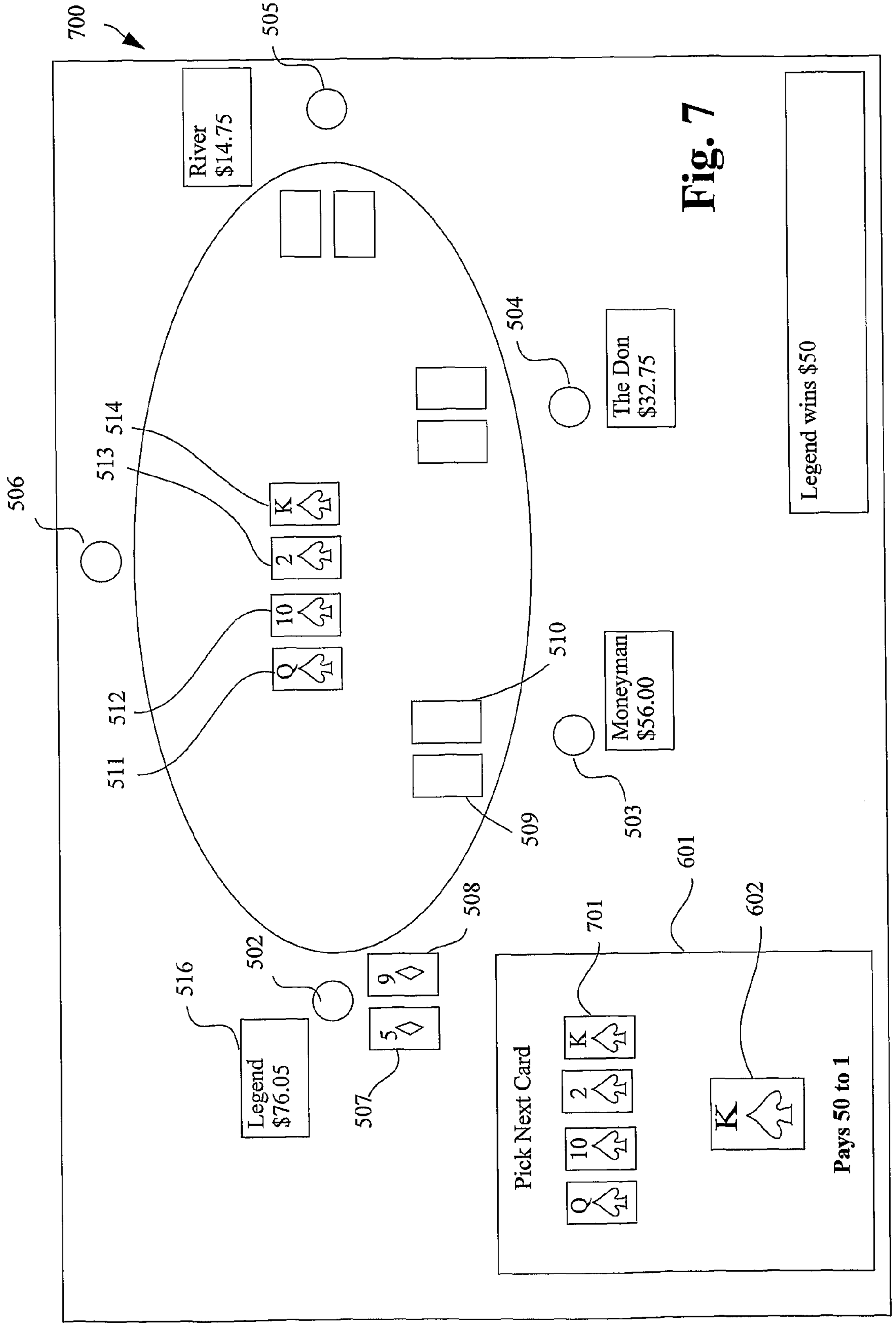
FIG. 7 shows the display screen of FIG. 6 after being updated.

A method 400 of performing a side game according to one embodiment will now be described by way of example, with reference to FIGS. 4, 6 and 7. The side game has different rules to the base game described above so that results of the side game are resolved according to another set of game rules. However, the results of the base game are linked to the side game. In particular, one or more of the results of the base game are used as inputs to the side game. This is the case for the other embodiments described herein.

One of the players 502 to 505 of the base game may bet on the side game and the side game may pay an amount of money separately to the base game. For example, the player 502 may fold in the base game described above and still play the side game and win an amount in the side game. In another example, the player 502 may win the hand of poker in the base game and also win an amount in the side game. Accordingly, the described arrangements allow the players to hedge their bets in the base game.

Figure 4:
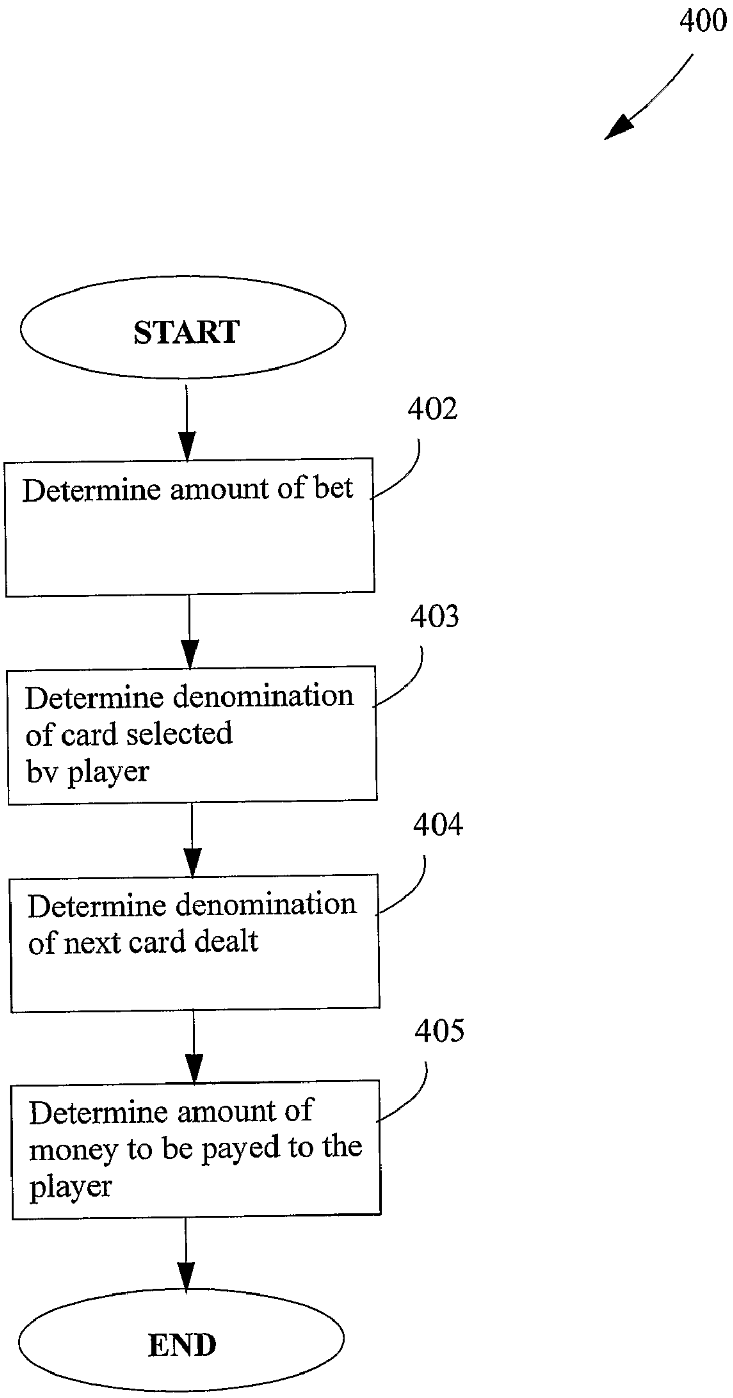
FIG. 4 is a flow diagram showing a method of performing a 'pick a card' side game.

The side game in the embodiment of FIG. 4 is a "pick a card" game where the player betting on the side game bets on the denomination of the next card to be dealt in the base game. FIG. 6 shows a screen 600 of the base game including the side game. As seen in FIG. 6, the screen 600 includes a side game area 601 for the pick next card side game. The side game area 601 indicates that the side game pays "50 to 1". For example, if the player 502 of the base game bets one dollar ($1) that the next card dealt in the base game will be a king of spades and is correct, then the side game will pay the player 502 fifty dollars ($50). The side game is preferably executed by the side game control application program 313 in conjunction with the base game application program 301 resident on the server 104B and being controlled in its execution by the processor 152.

In the present example, the player 502 is playing the base game on the computer 101B and places a bet on the side game. In the present example, the side game is played using the screen 600 of FIG. 6. The screen 600 is typically displayed on the display device 314B by the display controller application program 305 in conjunction with the side game application program 313. As seen in FIG. 6, the screen 600 shows the base game described above at the point where the flop has been dealt by the dealer 506 and the cards 511 to 513 are laid out to form the board on the table 501. As also seen in FIG. 6, the card 511 is a queen of spades, the card 512 is a ten of spades and the card 513 is a two of spades.

The method 400 begins at the first step 402, where the amount of a bet placed by the player 502 on the side game to be played is determined. The player may indicate the amount that they wish to bet on the particular side game, at step 402 using the input device 202. This amount is typically determined by the input device monitor application program 307 which examines player input via the input device 202B. In the described arrangements, the player may bet any amount on the side game. Upon the bet being placed by the player 502, the credit control application program 309 updates the CREDIT meter 516 to reflect the amount of the bet. In the present example, the player 502 bets one dollar ($1) on the side game.

Then at the next step 403, the processor 152 of the server 104B determines the domination of the card selected by the player 502 as their prediction (or pick) of the next card to be dealt (i.e., the turn card) in the base game. The card selected by the player 502 is typically determined by the side game application program 313 and the input device monitor application program 307 examining player input via the input device 202B. In the described arrangements, the player 502 selects the king of hearts as their prediction (or pick) of the denomination of the turn card. The player may indicate their prediction of the turn card at step 403 using the input device 202. The player 502 may be select the denomination of their prediction from a drop down menu (not shown), for example, displayed on the display 314B. Upon the card being selected by the player 502 at step 403, the side game application program 313 may display a representation 602 of the selected card in the side game area 601 as seen in FIG. 6.

At the next step 404, the processor 152 determines the denomination of the next card (i.e., the turn card) dealt in the base game. The base game application program 301 deals the turn card in the base game and the display controller application program 305 updates the screen 600 on the display 314B with the screen 700 as seen in FIG. 7. In the present example, the turn card 514 is the king of spades. The base game application program 301 notifies the side game application program 313 of the denomination of the turn card 514. Upon determining the denomination of the turn card 514 from the base game application program 301, the side game application 313 displays a representation 701 of the turn card 514 in the side game area 601 as seen in FIG. 7.

The method 400 concludes at the next step 405, where an amount of money to be payed to the player 502 for a correct prediction (or pick) is determined. This amount is typically determined by the win calculator application program 311 based on a pay table described above. As described above, the pay table for the present example pays "50 to 1" for a correct prediction. The screen 700 comprises a WIN indicator 802 as seen in FIG. 7 that indicates a monetary amount that the player has won from the side game. In the present example, fifty dollars ($50) are payed to the player 502 ("Legend") for correctly picking the denomination of the turn card 514.

Any one of the other players 503 to 505 may similarly play the side game by predicting the denomination of the turn card 514 prior to the turn card being dealt. The other players 503 to 505 have there own individual side game areas similar to the side game area 601 displayed on their displays.

Following the dealing of the turn card 514, all of the players 502 to 505 may similarly place a bet on the denomination of the next card (i.e., the river card) to be dealt in the main game, in accordance with the method 400.

As described above, when the turn card 514 is dealt, the representation 701 of the turn card 514 is displayed in the side game area 601. Accordingly, the players are essentially predicting the denomination of the next card to be displayed in the side game area 601.

Similarly, in one embodiment, the player 502 may also place a bet on the next card to be dealt to that player 502, in accordance with the method 400. For example, as described above, each player 502 to 505 is dealt two cards (e.g., 507, 508, 509 and 510), referred to as the hole cards, face down on the table 501. In this embodiment, as the card (e.g., 507) is dealt to the player (e.g., 502) a representation of the dealt card 507 is displayed in the side game area 601 in a similar manner to the representation 701 of the turn card 514. In this instance, the side game area 601 displaying the representation of the dealt card 507 is only displayed on the screen 314B being used by the player 502. As such, none of the other players 503 to 505 are able to see the denomination of the dealt card 507.

Prior to the card 507 being dealt, the player may place a bet on the side game, as at step 402, as to the denomination of the card 507. The player 502 may then select a card as their prediction (or pick) of the next card 507 to be dealt to that player, as at step 403. The player 502 may select the denomination of their prediction from a drop down menu (not shown), for example, displayed on the display 314B. Upon the card being selected by the player 502, the side game application program 313 displays a representation (e.g., 602) of the selected card in the side game area 601, as at step 403.

Then as at step 404, the side game application program determines the denomination of the card 507. In particular, the base game application program 301 deals the card 507 in the base game and the display controller application program 305 updates the screen (e.g, 600) on the display 314B to display the card 507 as seen in FIG. 6. The base game application program 301 then notifies the side game application program 313 of the denomination of the card 507. Upon determining the denomination of the card 507 from the base game application program 301, the side game application program 313 displays a representation (e.g., 701) of the card 507 in the side game area 601.

As at step 405, an amount of money to be payed to the player 502 for a correct prediction (or pick) of the denomination of the card 507, is determined. This amount is typically determined based on the bet placed by the player 502 and is payed to the player 502 ("Legend") for correctly picking the denomination of the card 507.

In another embodiment of the side game described above, a player such as the player 502 may bet that the next card dealt is "not" of a particular denomination. For example, based on the cards 511, 512 and 513 being dealt as shown in FIG. 7, prior to the card 514 being dealt, the player may place a bet on the side game, as at step 402, that the turn card 514 will not be a king. Then as at step 404, the base game application program 301 deals the card 514 in the base game and the display controller application program 305 updates the screen (e.g, 600) on the display 314B to display the card 514 as it is seen in FIG. 7. The base game application program 301 notifies the side game application program 313 of the denomination of the card 514. Upon determining the denomination of the card 514 from the base game application program 301, an amount of money is payed to the player 502 for a correct prediction (or pick) that the denomination of the card 514 would not be a king. Again, this amount is typically determined based on the bet placed by the player 502 and is payed to the player 502 ("Legend") for correctly making the predication.

One of the advantages of the above described embodiments is that hedging opportunities are opened up for the players 502 to 505. For example, in the example of FIGS. 6 and 7, the player 502 holds the cards 507 and 508 which are a five of diamonds and a nine of diamonds, respectively. Upon the turn card 514 being dealt, the player 502 may be concerned that one of the other players may have a spade flush. Accordingly, the player 502 may bet on the side game that the denomination of the river card 515 is a spade. That way, if the player 502 loses the base hand of the base game, the player 502 may still win money on the side game.

The embodiments described above obviously encourage players to bet more money. Therefore, the revenue of a gaming operator implementing the above embodiments will be increased.

Figure 8:
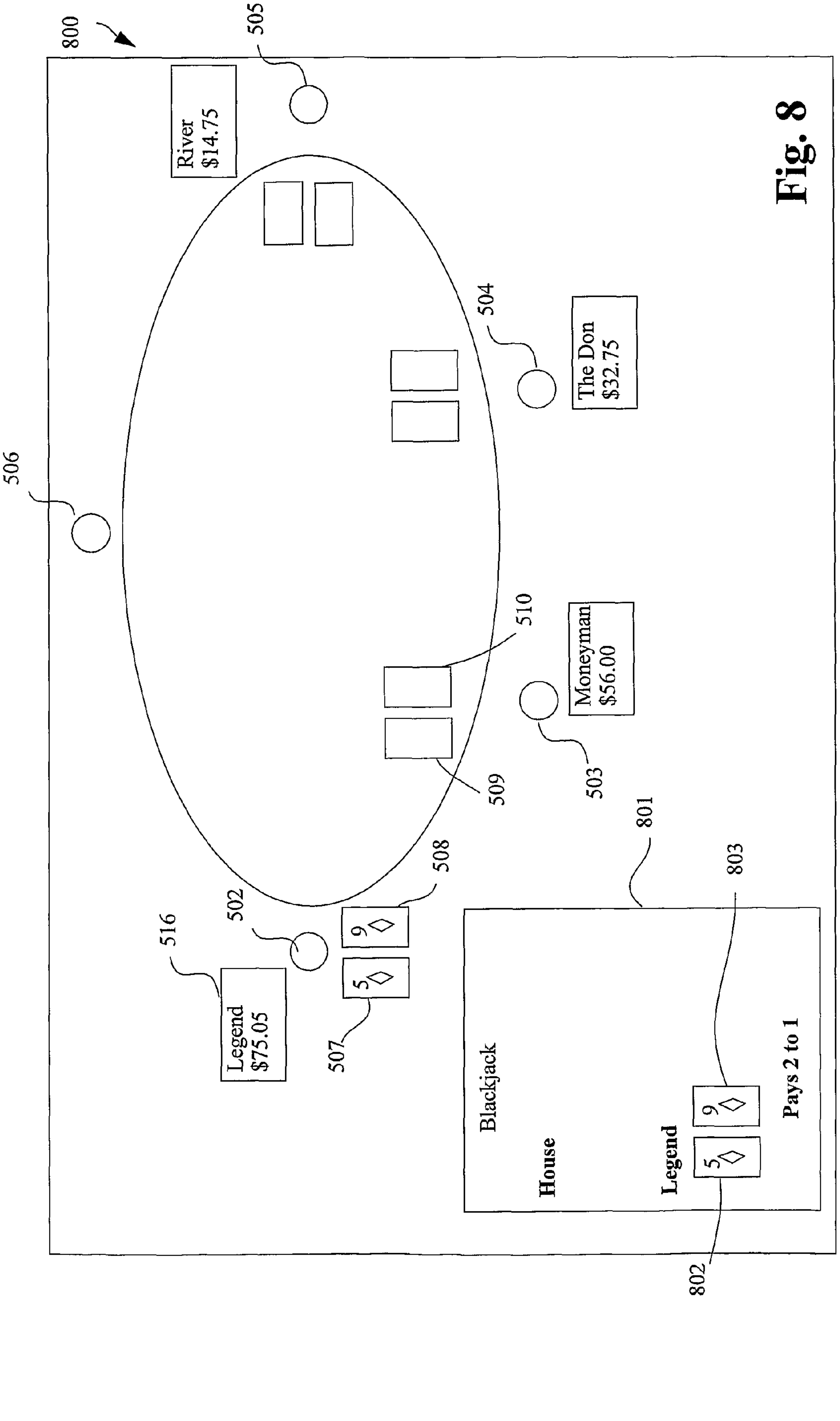
FIG. 8 shows a display screen presentation of the poker base game of FIG. 5 and a blackjack side game.

In another embodiment, the side game played with the poker base game described above may be blackjack. FIG. 8 shows a screen 800 of the blackjack side game and the above poker base game. As seen in FIG. 8, the screen 800 includes a side game area 801 for the blackjack side game. The side game area 801 indicates that the side game pays "2 to 1". The blackjack side game is preferably executed by the side game control application program 313 resident on the server 104B and being controlled in its execution by the processor 152 of the server 104B. Again, the player 502 is playing the base game on the computer 101B and places a bet on the side game.

Figure 11:
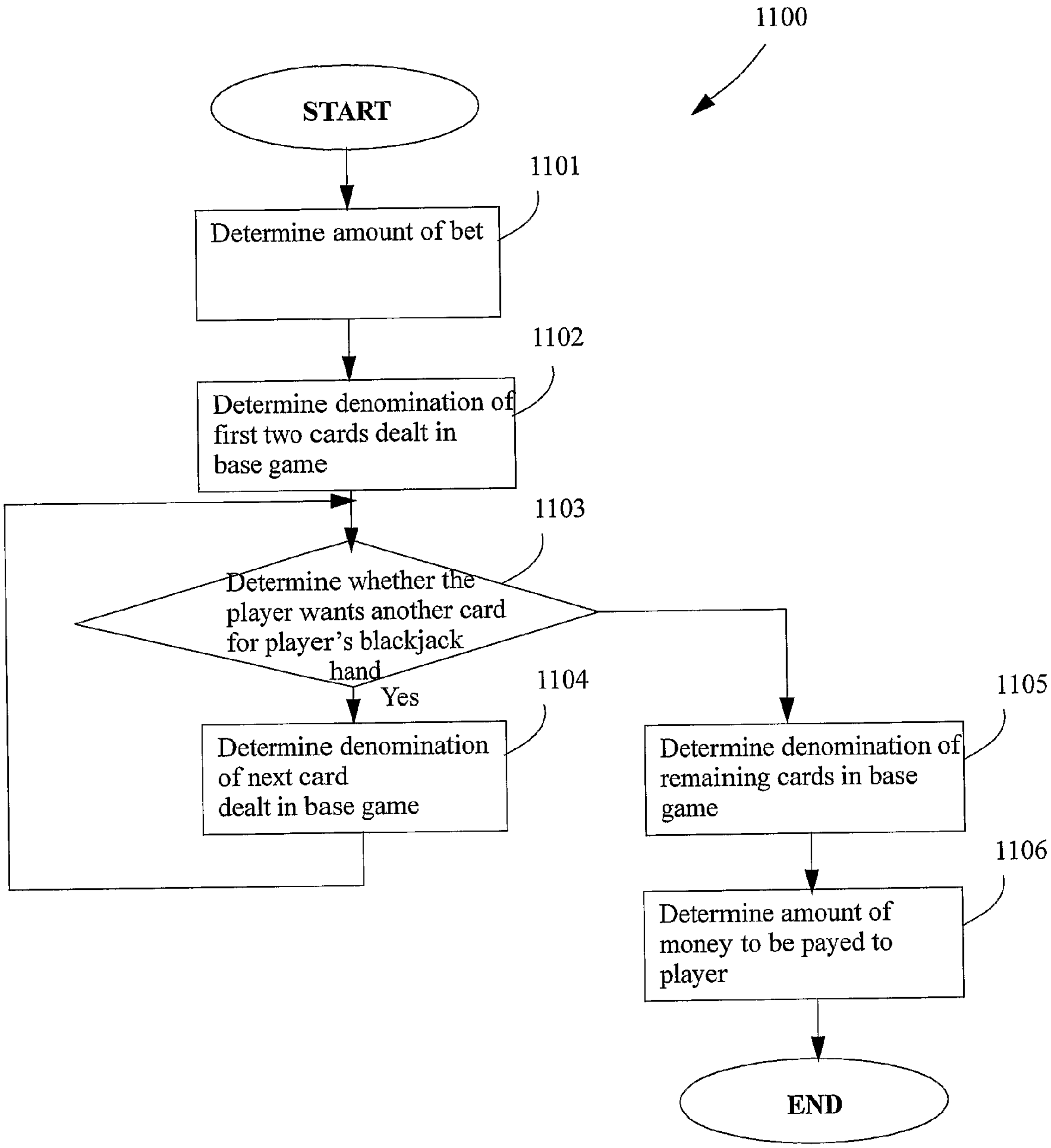
FIG. 11 is a flow diagram showing a method of performing the blackjack side game.

FIG. 11 is a flow diagram showing a method 1100 of performing another side game in the gaming system 100B. The method 1100 begins at the first step 1101, where the amount of a bet placed by the player 502 on the side game to be played is determined. This amount is typically determined by the input device monitor application program 307 examining player input via the input device 202B. In the described embodiments, the player may bet any amount on the side game. The player may indicate the amount that they wish to bet on the particular side game, at step 1101 using the input device 202. Upon the bet being placed by the player 502, the credit control application program 309 updates the credit meter 516 to reflect the amount of the bet. In the present example, the player 502 bets one dollar ($1) on the side game.

At the next step 1102, the side game application program 313 determines the denomination of the first two cards 507 and 508 dealt to the player 502 in the base game. In particular, the base game application program 301 deals the two cards 507 and 508. The display controller application program 305, in conjunction with the side game application program 313, displays the screen 800 of the blackjack side game showing the dealt cards 507 and 508, as seen in FIG. 8. As described above, the dealt cards 507 and 508 form the first two cards of the poker hand for the player 502 in the base game. The cards 507 and 508 also form the first two cards of the blackjack hand for the player 502. In the present example, the player 502 has a blackjack hand of fourteen (14). Representations 802 and 803 of each of the cards 507 and 508, respectively, are displayed in the side game area 801 under the name of the player 502. In one embodiment, the screen 800 may be displayed following display of an earlier screen merely showing the representation 802 of the first card 507.

Then at the next step 1103, if the processor 152 determines that the player 502 has elected to receive another card for their blackjack hand, the method 1100 proceeds to step 1104. Otherwise, the method 1100 proceeds to step 1105. In the present example, the player 502 elects to receive another card for their blackjack hand. Alternatively, the player 502 may elect to 'stand' (i.e., not to receive any further cards for their blackjack hand).

Figure 9:
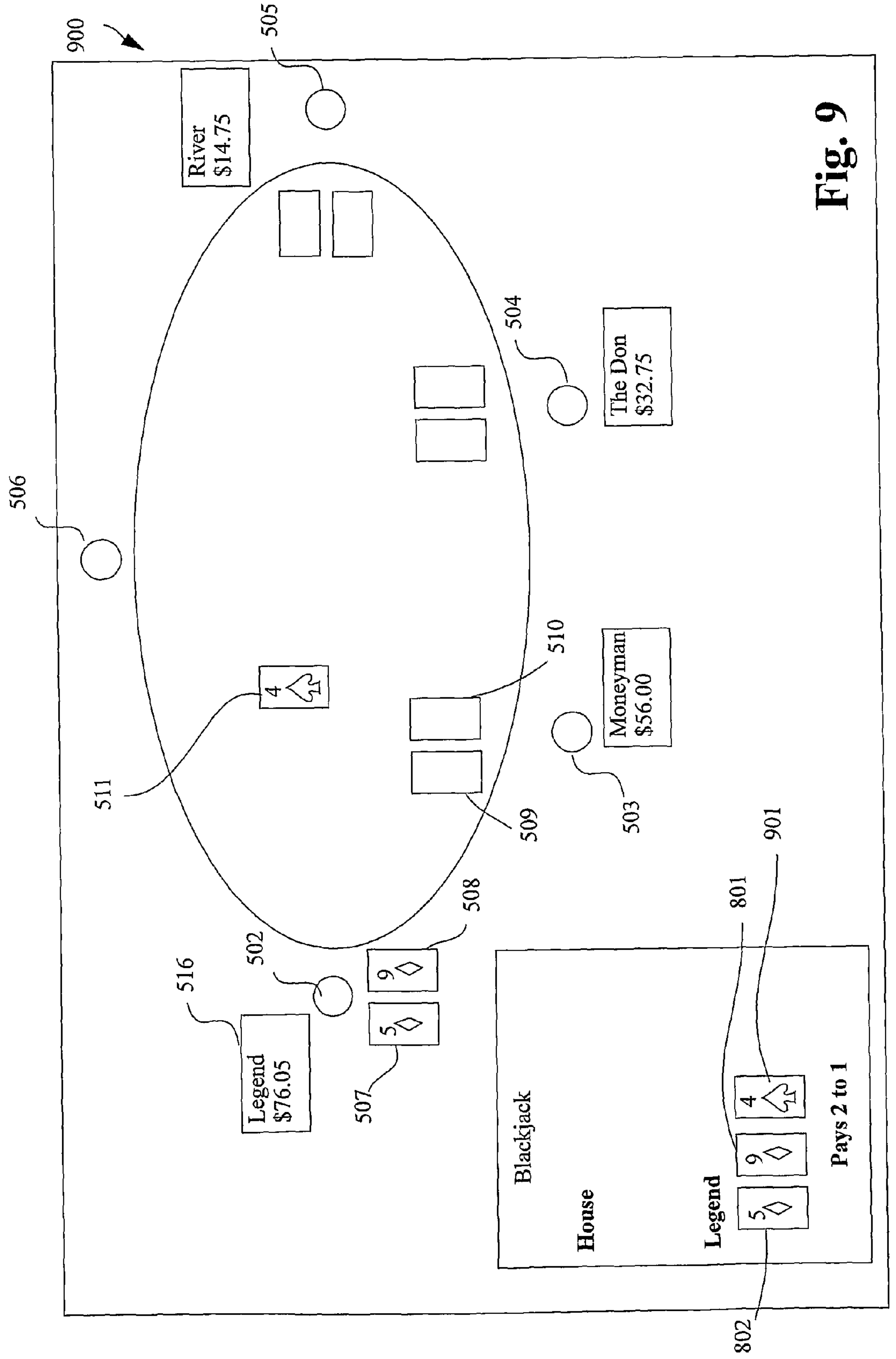
FIG. 9 shows the display screen of FIG. 8 after being updated.
Figure 10:
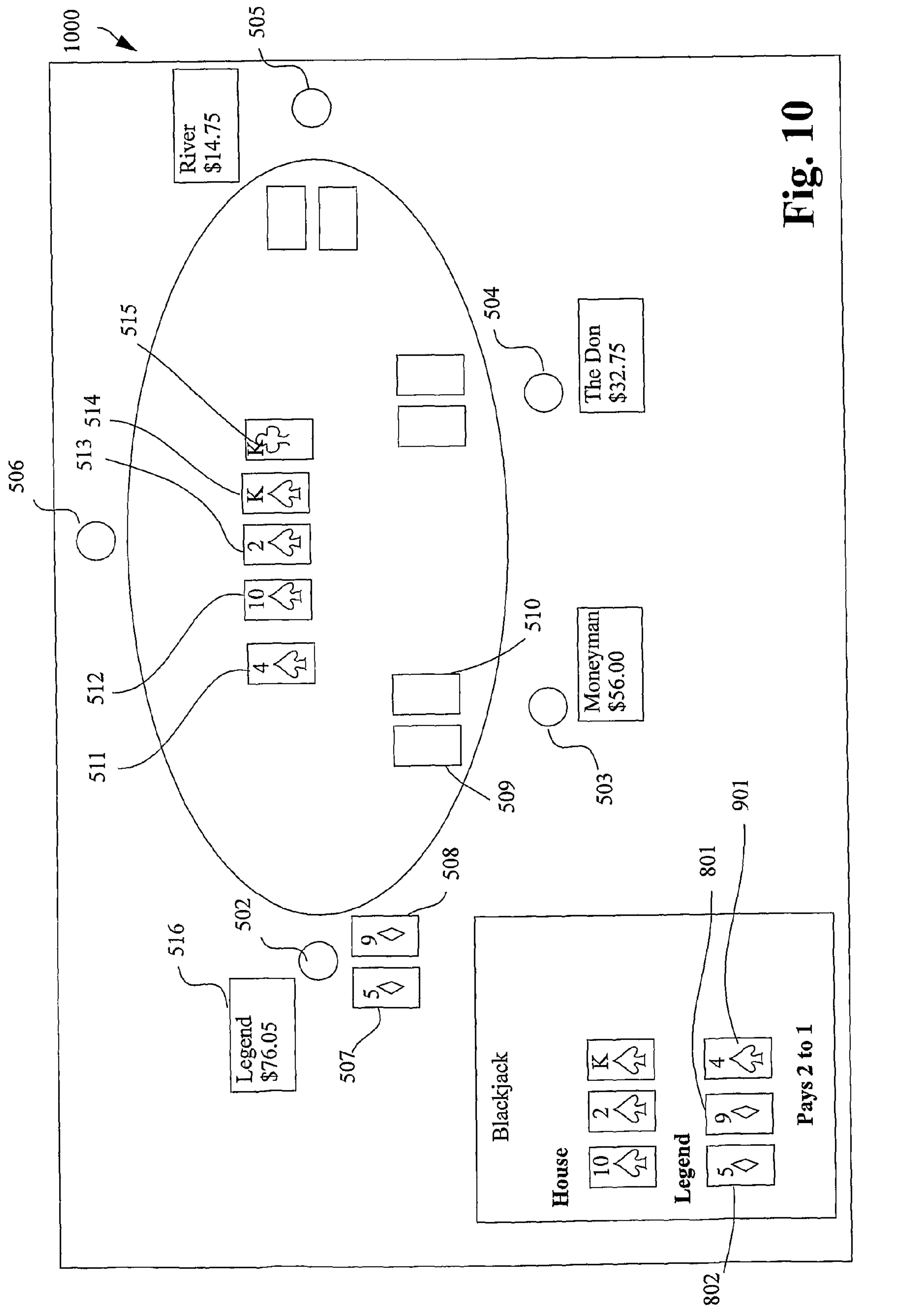
FIG. 10 shows the display screen of FIG. 8 after being further updated.

At the next step 1104, the side game application program 313 determines the denomination of the next card 511 dealt in the base game, which is the first card in the flop. However, in the example of FIGS. 8 to 10, the card 511 is the four of spades rather than the queen of spades. The display controller application program 305, in conjunction with the side game application program 313, displays another screen 900 of the blackjack side game showing the dealt card 514. The dealt card 514 forms the next card in the blackjack hand for the player 502. Accordingly, the blackjack hand for the player 502 is now equal to eighteen (18). A representation 901 of the card 511 is displayed in the side game area 801. Following step 1104, the method 1100 returns to step 1103, where the processor 152 determines whether the player elects to receive another card for their blackjack hand. In the present example, the player 502 elects to stand and not receive another card for their blackjack hand. Alternatively, the player 502 may elect to receive another card for their blackjack hand. In this instance, the next card for the blackjack hand of the player would be the card 512 of the flop.

At step 1105, the processor 152 deals the remaining cards 512, 513, 514 and 515 in the base game. In the described embodiment, two or more of these remaining cards 512 to 515 form the blackjack hand for the dealer 506. The cards 512, 513, 514 and 515 are a ten of spades, a two of spades, a King of spades and a King of clubs, respectively. The display controller application program 305, in conjunction with the side game application program 313, displays another screen 1000 of the blackjack side game showing the dealt cards 512 to 515, as in FIG. 10. A number of intermediate screens may also be displayed in sequence after the screen 900 and the screen 1000 as each of the cards 512 to 515 is dealt.

Following the dealing of the card 513 in the base game, the blackjack hand of the dealer 506 is twelve (12) which is still less than the blackjack hand of the player 502. Accordingly, the next card 514 dealt in the base game also forms part of the dealer's blackjack hand. The card 514 is a King of spades taking the dealer's hand to twenty-two and therefore the dealer is bust in the blackjack hand and the player 502 wins the blackjack hand.

The method 900 concludes at the next step 1106, where an amount of money to be payed to the player 502 for the blackjack is determined. This amount is typically determined by the win calculator application program 311 based on a pay table described above. As described above, the pay table for the present example pays "2 to 1" for a correct prediction. The credit meter 516 for the player 502 is also updated to reflect the amount payed to the player 502 for winning the hand of the blackjack side game.

Following execution of the method 1100 for the blackjack side game, the base game continues as described above. Any one of the other players 503 to 505 may similarly play the blackjack side game during the base game. The players 502 to 505 may similarly place their own bets on the blackjack side game, in accordance with the method 1100.

In another embodiment, the side game played with the poker base game described above may be a video poker game. In this instance, as the cards are dealt in the poker base game, representations of the cards are displayed in a side game area. If a poker hand is made from the cards displayed in the side game area, then a payout is made to a player of the poker base game and video poker side game according to a pay table.

Figure 16:
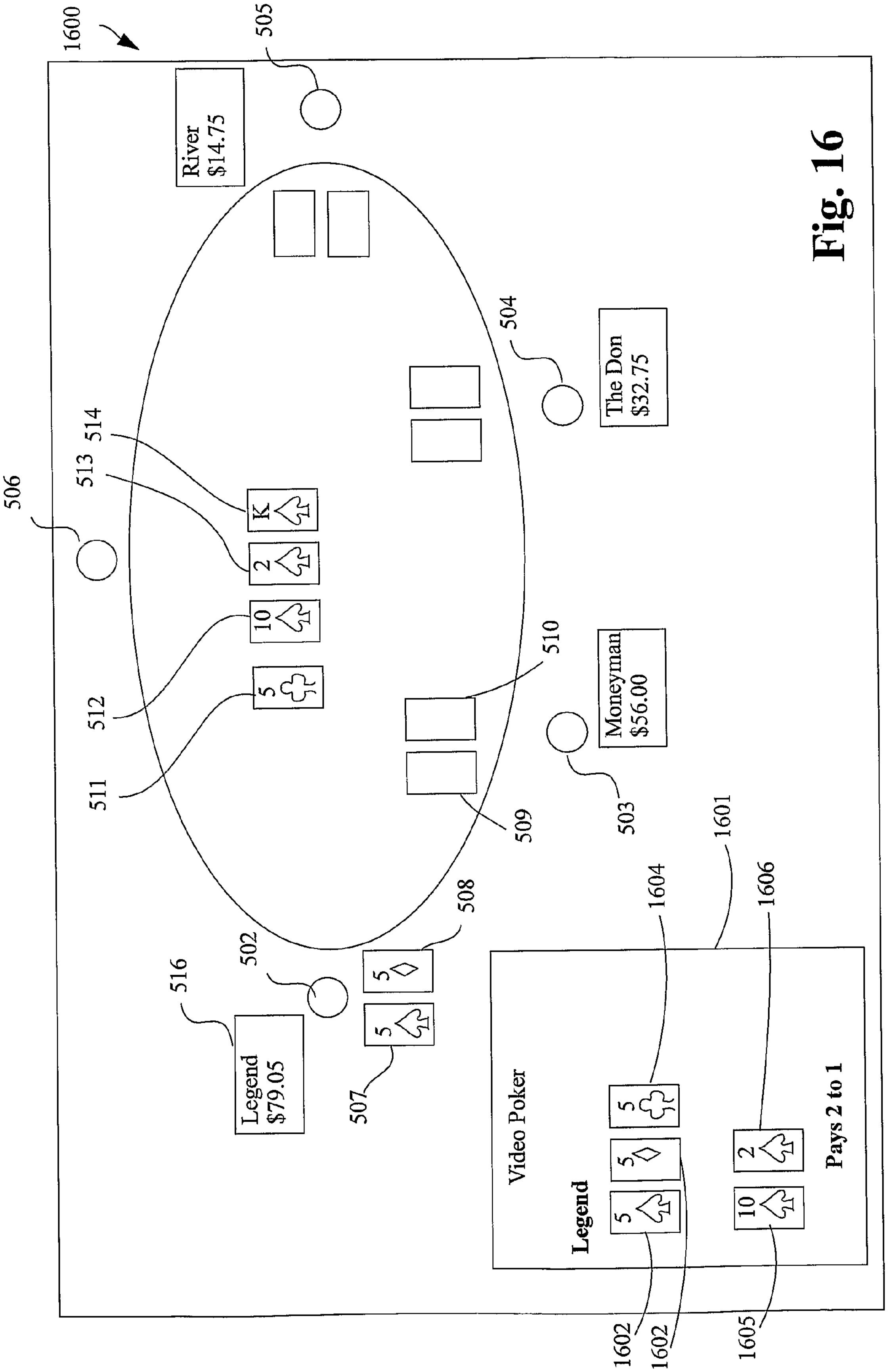
FIG. 16 shows a display screen presentation of the poker base game and a video poker side game.

FIG. 16 shows a screen 1600 of a video poker side game and the above described poker base game. As seen in FIG. 16, the screen 1600 includes a side game area 1601 for the video poker side game. The side game area 1601 indicates that the side game pays "2 to 1". The video poker side game is preferably executed by the side game control application program 313 resident on the server 104B and being controlled in its execution by the processor 152 of the server 104B. Again, the player 502 is playing the base game on the computer 101B and places a bet on the side game.

Figure 17:
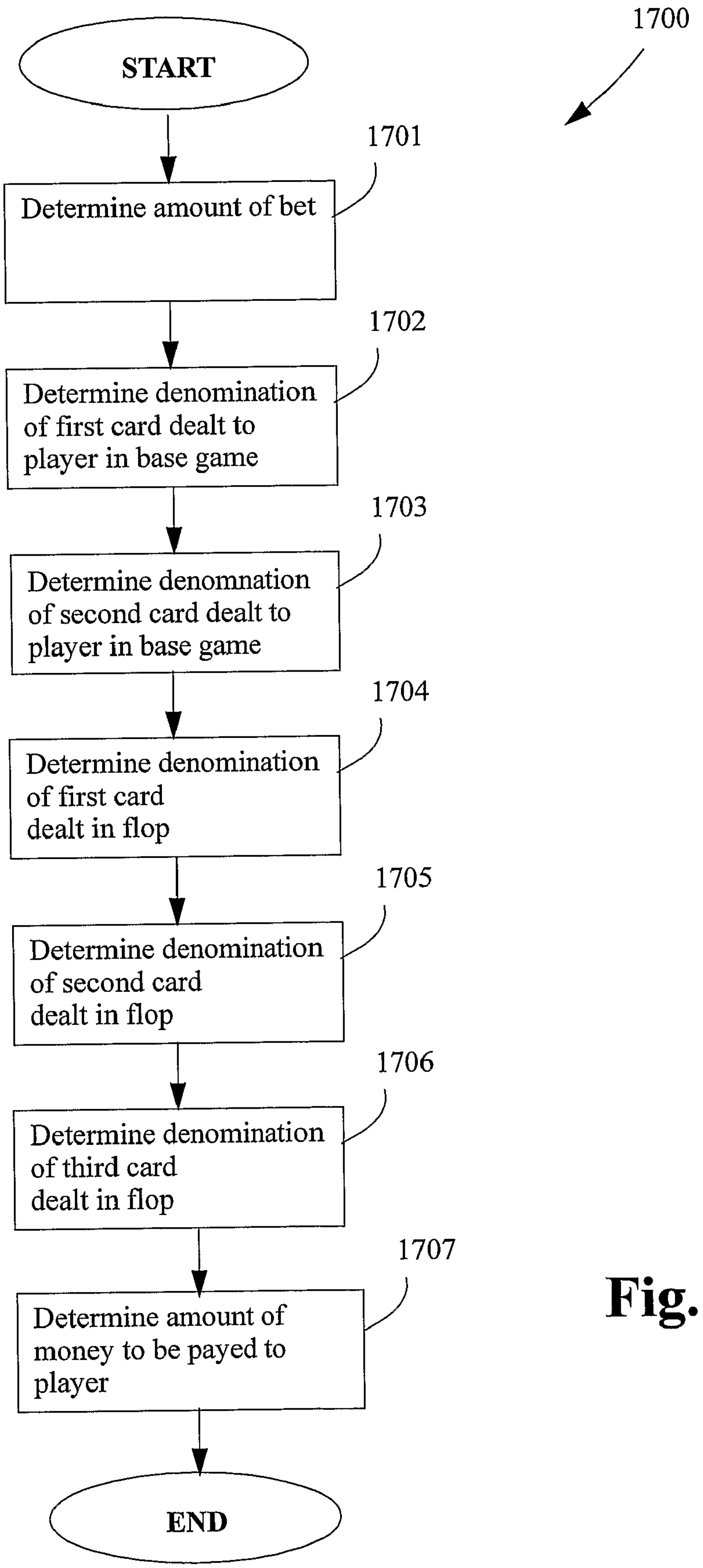
FIG. 17 is a flow diagram showing a method of performing the video poker side game.

FIG. 17 is a flow diagram showing a method 1700 of performing the video poker side game in the gaming system 100B. The method 1600 begins at the first step 1601, where the amount of a bet placed by the player 502 on the side game to be played is determined. This amount is typically determined by the credit control application program 309 being controlled in its execution by the input device monitor application program 307 examining player input via the input device 202B. In the described embodiments, the player may bet any amount on the side game. The player may indicate the amount that they wish to bet on the particular side game, at step 1701 using the input device 202. Upon the bet being placed by the player 502, the credit control application program 309 updates the credit meter 516 to reflect the amount of the bet. In the present example, the player 502 bets one dollar ($1) on the side game.

At the next step 1702, the side game application program 313, being controlled in its execution by the processor 152, determines the denomination of the first card 507 dealt in the base game to the player 502. The display controller application program 305, in conjunction with the side game application program 313, displays a screen (not shown) of the blackjack side game showing the dealt card 507. In the example of FIG. 16, the dealt card 507 is a five of spades and forms the first card of the poker hand for the player 502 in the base game. The card 507 also forms the first card of the video poker hand for the player 502. A representation 1602 of the card 507 is displayed in the side game area 1601 as seen in FIG. 16.

Then at the next step 1703, the side game application program 313 determines the denomination of the next card 508 dealt in the base game. In the example of FIGS. 16 and 17, the card 508 is the five of diamonds rather than the nine of diamonds. The display controller application program 305, in conjunction with the side game application program 313, displays another screen (not shown) of the poker base game and video poker side game showing the dealt card 514. The dealt card 508 forms the next card in the base game poker hand for the player 502 and the next card in the video poker side game hand of the player 502. A representation 1603 of the card 508 is displayed in the side game area 1601.

At the next step 1704, the side game application program 313 determines the denomination of the next card 511 dealt in the base game, which is the first card in the flop. However, in the example of FIGS. 16 and 17, the card 511 is the five of clubs rather than the queen of spades. The display controller application program 305, in conjunction with the side game application program 313, displays another screen (not shown) of the poker base game and video poker side game showing the dealt card 514. The dealt card 514 forms the next card in the poker base game hand for the player 502 and the next card in the video poker side game hand for the player 502. A representation 1604 of the card 511 is displayed in the side game area 1601.

At the next step 1705, the side game application program 513 determines the denomination of the next card 512 in the base game which is the second card in the flop. In the example of FIGS. 16 and 17, the card 512 is the ten of spades. The display controller application program 305, in conjunction with the side game application program 313, displays another screen (not shown) of the poker base game and video poker side game showing the dealt card 512. The dealt card 512 forms the next card in the poker base game hand for the player 502 and the next card in the video poker side game hand for the player 502. A representation 1605 of the card 512 is displayed in the side game area 1601.

Then at the next step 1706, the side game application program 313 determines the denomination of the next card 513 dealt in the base game which is the third card in the flop. In the example of FIGS. 16 and 17, the card 513 is the two of spades. The display controller application program 305, in conjunction with the side game application program 313, displays another screen (not shown) of the poker base game and video poker side game showing the dealt card 512. The dealt card 513 forms the next card in the poker base game hand for the player 502 and the next card in the video poker side game hand for the player 502. A representation 1606 of the card 512 is displayed in the side game area 1601.

Following the dealing of the card 513 in the base game, fives cards have been dealt to the player 502 in the video poker side game and the video poker hand of the player 502 is three fives, a ten and a two.

The poker base game may continue with the dealing of the final two cards 514 and 515 in the flop. However, the method 1700 concludes at the next step 1707, where an amount of money to be payed to the player 502 for the video poker hand of three fives is determined. This amount is typically determined by the win calculator application program 311 based on a pay table. The pay table for the present example may pay "3 to 1" for a such a hand. The credit meter 516 for the player 502 is also updated to reflect the amount payed to the player 502 for winning the hand of the blackjack side game.

In another embodiment, the base game may be craps. The results of the craps game are resolved according to a set of game rules. Craps is a game played by one or more players. Players take turns rolling two dice. The player rolling the dice is called the "shooter". The game is played in rounds, with the first roll of a new round called the "come-out roll." On the come-out roll if the total of the two dice are seven (7), eleven (11), two (2), three (3) or twelve (12), the round ends immediately and the shooter must roll another come-out roll. A result of two (2), three (3) or twelve (12) is called 'craps' while a result of seven (7) or eleven (11) is called a 'win' or a 'natural'. When any other number (e.g., four (4), five (5), six (6), eight (8), nine (9), or ten (10)) is rolled on the come-out roll, this number becomes what is called the point. If a point is established then the shooter will re-roll the dice continuously until either a seven (7) is rolled, or the point is rolled again. If the shooter rolls the point again, the round ends and the game starts over with the same shooter rolling another come-out roll. If the shooter rolls a seven (7) instead of the point, this is called a 'seven-out', the round ends and the dice pass to the next player to the left, who becomes the new shooter.

Players can make any of a large number of bets. Most of these are betting on the way the round will end (point comes or a seven out). Other betting can include betting on a specific total being rolled, or a specific total being rolled before a seven (7).

The craps base game may be implemented and played on the gaming system 100B in a similar manner to the poker base game described above. The craps base game may be implemented by the base game application program 301. A representation of a craps table may be displayed by the display controller application program 305 in conjunction with the base game application 301 in a similar manner to the poker table 501 described above.

In the craps base game, a new shooter rolls two dice. The rolling of the two dice and the results of such a throw may be represented by one or more screens displayed on the display device 314B by the display controller application program 305 in conjunction with the base game application 301 in a similar manner to the screens (e.g., 500) described above.

Figure 12:
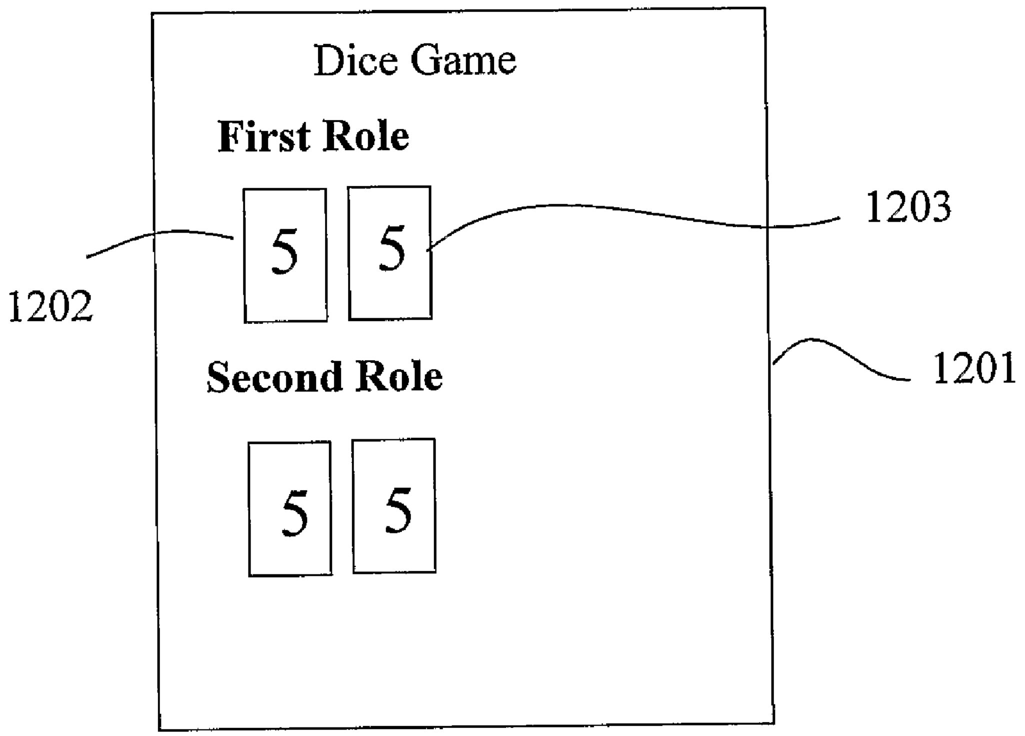
FIG. 12 shows a side game area for a dice side game.

In one embodiment, a side game of the craps base game may be another dice game. FIG. 12 shows a side game area 1201 for such a side dice game. The side game area 1201 may be displayed on the display 314B together with the screens of the craps base game.

Figure 13:
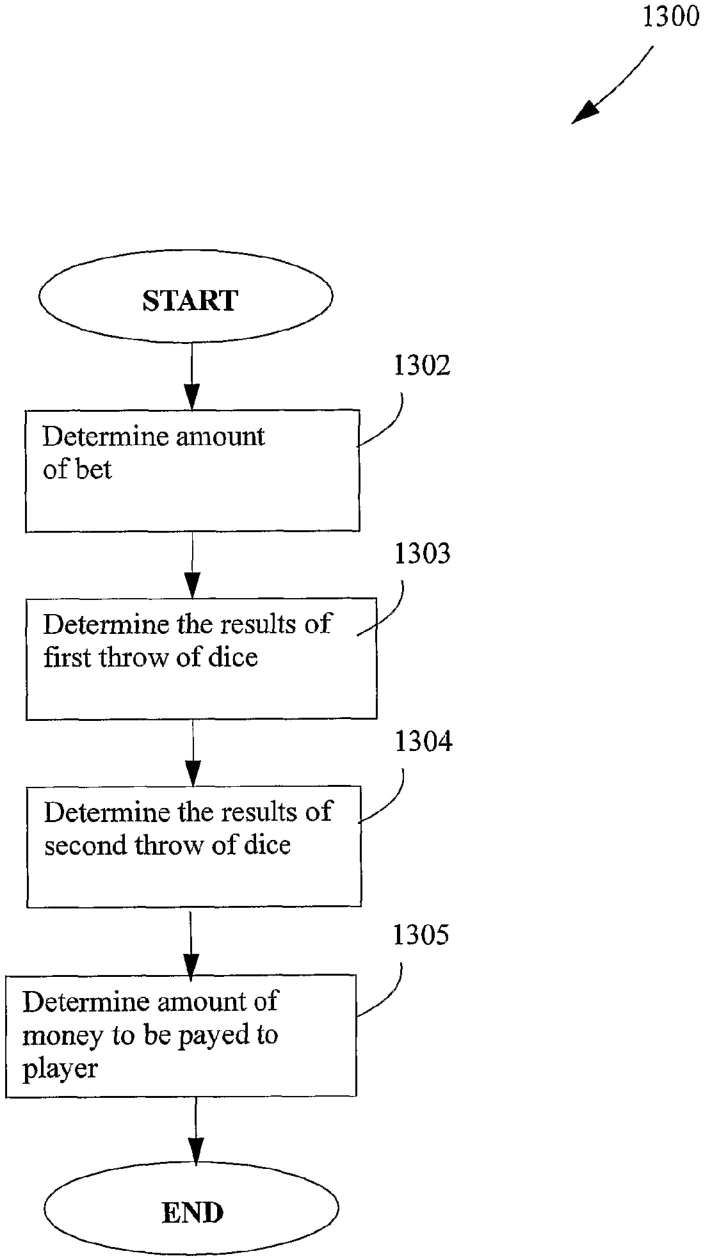
FIG. 13 is a flow diagram showing a method of performing the dice side game.

A method 1300 of performing a dice side game according to one embodiment will now be described by way of example with reference to FIG. 13. The dice side game has different rules to the base game described above so that results of the dice side game are resolved according to another set of game rules. However, the results of the craps base game are linked to the dice side game. In particular, as described above for other embodiments, one or more results of craps base game are used as inputs to the dice side game. One of the players of the craps base game may bet on the dice side game and the dice side game may pay an amount separately to the craps base game. As seen in FIG. 12, dice side game area displays the results of two throws in the craps base game.

The method 1300 begins at a first step 1301, where the amount of a bet placed by a player on the dice side game to be played is determined. This amount is typically determined by the input device monitor application program 309 being controlled in its execution by the processor 152 of the server 104B examining player input via the input device 202B. In the described embodiments, the player may bet any amount on the side game. The player may indicate the amount that they wish to bet on the particular side game, at step 1302 using the input device 202. In the present example, the player bets one dollar ($1) on the dice side game. Following the bet, the player rolls two dice. The roll of the dice may be represented by one or more screens displayed on the display device 314B by the display controller application program 305 in conjunction with the base game application program 301 in a similar manner to the screens (e.g., 500) described above.

At the next step 1303, the side game application program 313, being controlled in its execution by the processor 152 of the server 104B, determines the results of the first role of the dices in the craps base game. In the present example, the first two dice thrown by the player result in two fives (i.e., 5, 5). The base game application program 301 notifies the side game application program 313 of the results of the roll. Upon determining the results of the roll from the base game application program 301, the side game application 313 displays representations 1202 and 1203 of the results of the two rolled dice in the side game area 1201 as seen in FIG. 12.

Then at the next step 1304, the side game application program 313 determines the results of the second role of the dice in the craps base game in a similar manner to step 1303. In the present example, the second two dice rolled by the player result in two fives. The base game application program 301 notifies the side game application program 313 of the results of the throw. Upon determining the results of the throw from the base game application program 301, the side game application 313 displays representations 1204 and 1205 in the side game area 1201 as seen in FIG. 12.

The method 1300 concludes at the next step 1305, where an amount of money to be payed to the player for the results of the dice side game (i.e., four fives) is determined. Again, this amount is typically determined by the win calculator application program 311 based on a pay table. In the described arrangement, the pay table for the present example pays as follows:

| | |
|---|---|
| (i) four times one (1): | one times the bet placed by the player; |
| (ii) four times two (2): | two times the bet placed by the player; |
| (iii) four times three (3): | three times the bet placed by the player; |
| (iv) four times four (4): | fours times the bet placed by the player; |
| (v) four times five (5): | five times the bet placed by the player; and |
| (vii) four times six (6): | six time the bet placed by the player. |

The pay table for the dice side game may also treat a six (6) as a wild. For example, in the example described above, the first throw of the dice may result in a six (6) and a five (5) and the second throw may result in two fives. In this instance, the result of the two throws is treated as four fives (5) and since the combination includes the six (6), the pay table pays tens times (10×) the bet.

In another embodiment, the base game may be roulette. The results of the roulette base game are resolved according to a set of rules. In the roulette base game a wheel is spun in one direction and a ball is spun in the opposite direction around a tilted circular surface running around the circumference of the wheel. The ball eventually falls onto the wheel and into one of thirty seven (37) colored and numbered pockets on the wheel. The main pockets are numbered from one (1) to thirty six (36) alternating between red and black, but the pockets are not in numerical order around the wheel, and there are instances of consecutive numbers being the same color. There is a green pocket numbered zero (0).

Players can place a variety of "inside" bets by selecting the number of the pocket the ball will land in, or range of pockets based on their position. The players can also place a number of "outside" bets including bets on various positional groupings of pockets, pocket colors, or whether the number of the pocket where the ball lands is odd or even. The payout odds for each type of bet are based on the probability of the bet.

The roulette base game may be implemented and played on the gaming system 100B in a similar manner to the poker and craps base games described above. The roulette base game may be implemented by the base game application program 301. A representation of a roulette table and wheel may be displayed by the display controller application program 305 in conjunction with the base game application 301 in a similar manner to the poker table 501 described above.

The spinning of the wheel and ball in the roulette base game may be represented by one or more screens displayed on the display device 314B by the display controller application program 305 in conjunction with the base game application program 301 in a similar manner to the screens (e.g., 500) described above.

Figure 14:
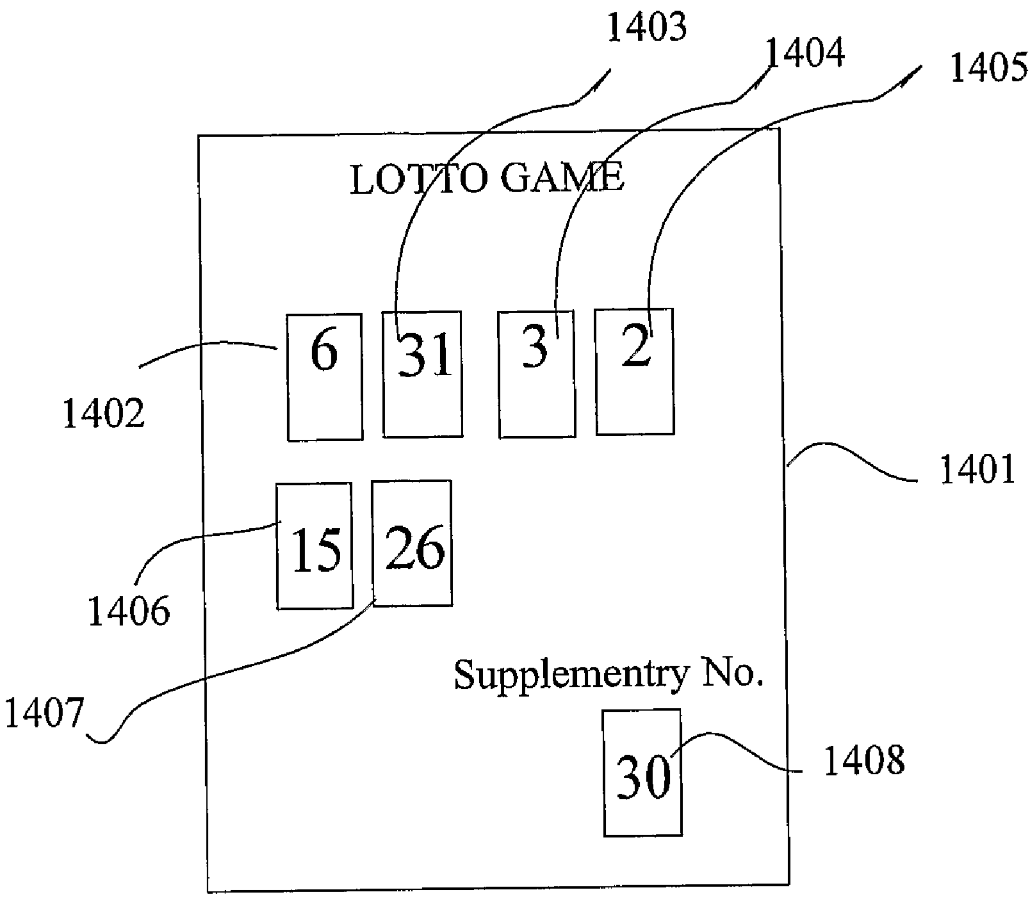
FIG. 14 shows a side game area for a lotto side game.

In one embodiment, a side game of the roulette base game may be a lotto game. FIG. 14 shows a side game area 1401 for such a lotto side game. The side game area 1401 may be displayed on the display 314B together with the screens of the roulette base game in a similar manner to the side game area 801 described above.

Figure 15:
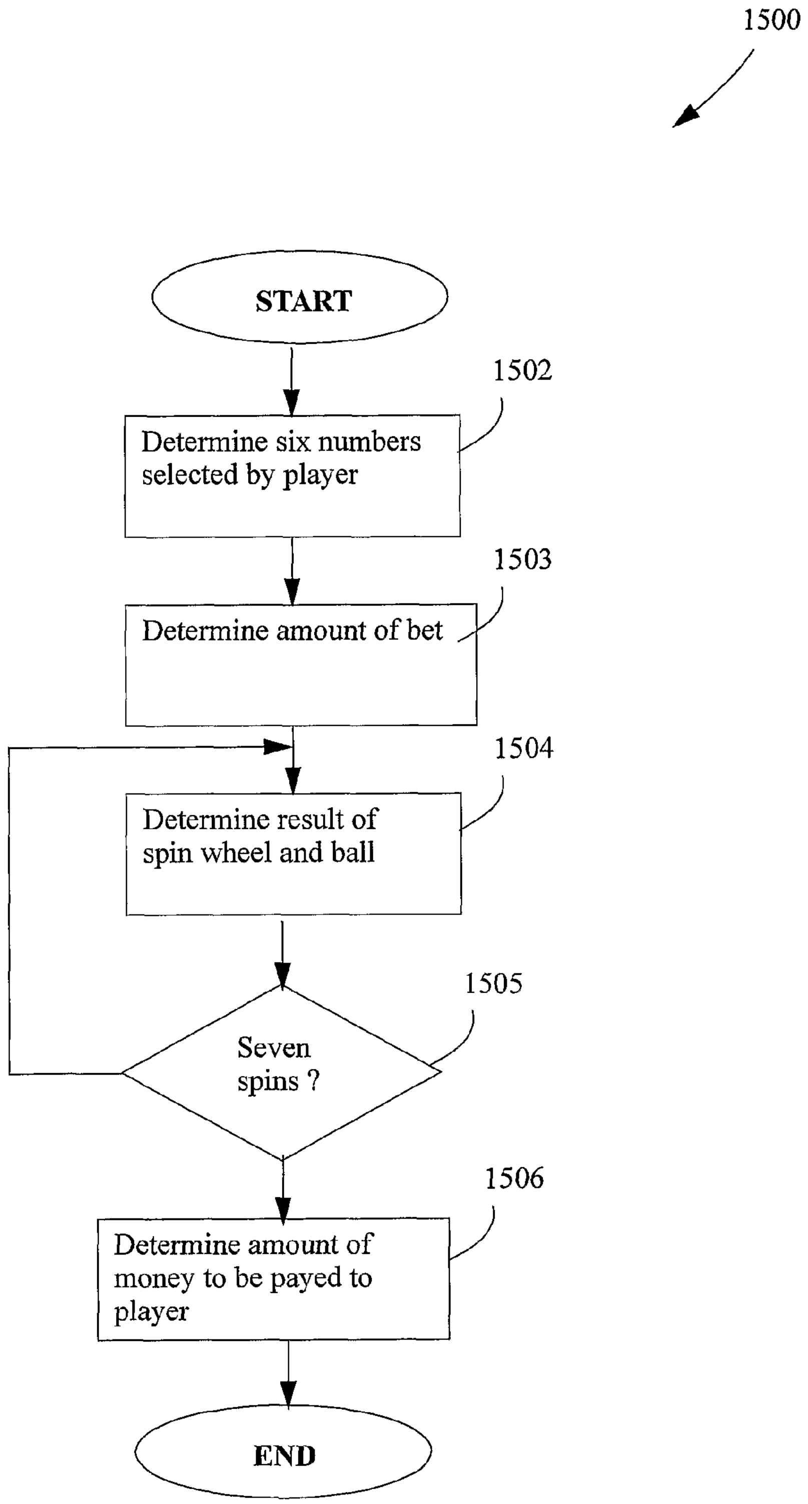
FIG. 15 is a flow diagram showing a method of performing the lotto side game.

A method 1500 of performing a lotto side game according to one embodiment will now be described by way of example, with reference to FIG. 15. The lotto side game has different rules to the roulette base game described above so that results of the lotto side game are resolved according to another set of game rules. However, the results of the roulette base game are linked to the lotto side game. In particular, as described above for other embodiments, one or more results of roulette base game are used as inputs to the lotto side game.

One of the players of the roulette base game may bet on the lotto side game and the side game may pay an amount separately to the base game. As seen in FIG. 14, the side game area 1401 displays representations 1402, 1403, 1404, 1405, 1406, 1407 and 1408 of the results of seven consecutive spins of the roulette wheel in the roulette base game. In the example of FIG. 14, the results of seven consecutive spins of the roulette wheel are '6', '31', '3', '2', '15', '26' and '30' as represented by the representations 1402, 1403, 1404, 1405, 1406, 1407 and 1408 respectively. The displayed results are the results of the lotto side game.

The method 1500 begins at a first step 1502, the side game application program 313 determines six numbers as selected by a player of the base game for the lotto side game. An initial screen (not shown) of the roulette base game including the side game area 1401 is displayed on the display 314B by the processor 152 of the server 104B prior to the player selectin the six numbers. The screens of the roulette base game are displayed by the display controller application program 305 in conjunction with the side game application program 313. The player may select the six numbers using the screen and the input device 202B.

Then at the next step 1503, the amount of a bet placed by a player on the side game to be played is determined. This amount is typically determined by the credit control application program 309 being controlled in its execution by the input device monitor application program 313 typically examining player input via the input device 202B. In the described arrangements, the player may bet any amount on the lotto side game. The player may indicate the amount that they wish to bet on the particular side game, at step 1502 using the input device 202. In the present example, the player bets one dollar ($1) on the lotto side game.

Then at the next step 1504, the roulette wheel and ball are spun and the results of the spin are determined. As described above, the spinning of the roulette wheel and ball may be represented by one or more screens displayed on the display device 314B by the display controller application program 305 in conjunction with the base game application 301 in a similar manner to the screens (e.g., 500) described above. The base game application program 301 notifies the side game application program 313 of the results of the roulette wheel spin. Upon determining the results of the spin from the base game application program 301, the side game application 313 displays a representation 1402 of the result in the side game area 1401 as seen in FIG. 14.

Then at the next step 1505, if the roulette wheel has been spun seven times so that all of the representations 1402 to 1408 of the roulette wheel results have been represented in the side game area 1401, then the method 1500 proceeds to step 1506. Otherwise, the method 1500 returns to step 1504.

The method 1500 concludes at step 1506, where an amount of money to be payed to the player for the results of the lotto side game is determined. Again, this amount is typically determined by the win calculator application program 311 based on a pay table. The amount of money payed to the player is based on a comparison of the numbers selected by the player, as at step 1502, compared to the results of seven the roulette wheel spins. In the described arrangement, the result of the seventh roulette wheel spin is a supplementary number, as will be described below. The pay table for the present example pays for the matching the player's selections and the roulette wheel results as follows:

(i) three numbers and the supplementary number;
(ii) four numbers;
(iii) four numbers and the supplementary number;
(iv) five numbers;
(v) five numbers and the supplementary number; and
(vi) six numbers.

In one embodiment, the side game may be a sports game such as virtual baseball or hammer throwing. A side game area for such a side game may comprise a virtual representation of a baseball player and baseball diamond. The length of a hit by the baseball player in the side game may be determined by the results of a card base game, such as poker, blackjack or baccarat being played on the system 100B. Accordingly, the results of the card base game are resolved according to a set of rules and the results of the sports side game are resolved according to another set of rules. In particular, as described above for the other embodiments, one or more results of the card base game are used as inputs to the sports side game. As the cards are dealt in the card base game, the representation of the baseball player swings at a baseball, the length of the hit and the number of bases able to be run by the baseball player is determined by the denomination of the dealt card. The denominations of the dealt cards may be related to the length of the hit and the number of bases able to be run as follows:

| | |
|---|---|
| (i) ace to king: | home run; |
| (ii) queen to ten: | third base hit; |
| (iii) nine to seven: | second base hit; |
| (iv) six to four: | first base hit; and |
| (v) three to one: | strike. |

In the sports side game described above, a player of the side game may bet on the denomination of the next card to be dealt in the card base game being played by the player in a similar manner to the pick a card game described above.

In another embodiment, the baseball sports side game may be played with a roulette base game in a similar manner the card base games described above. In this instance, the length of a hit by the baseball player in the side game may be determined by the results of the roulette base game. As the results of the roulette base game are determined the representation of the baseball player swings at a baseball with the length of the hit and the number of bases able to be run by the baseball player being determined by the result of the roulette game. The results of the roulette game may be related to the length of the hit and the number of bases able to be run as follows:

| | |
|---|---|
| (i) thirty six to twenty nine: | home run; |
| (ii) twenty eight to twenty one: | third base hit; |
| (iii) twenty to fourteen: | second base hit; |
| (iv) thirteen to six: | first base hit; and |
| (v) five to zero: | strike. |

In the sports side game and roulette base game described above, a player of the side game may bet on the length of the hit (or the range of numbers within which the roulette wheel spin result falls) in a similar manner to the pick a card game described above.

In still another embodiment, the base game being played on the gaming system 100 may be a sports base game. For example, a player may bet on the winning score in a football game, the number of a player to score the first points in the football game, the winner of an athletics race or horse race, the winner of a car race or any other suitable sporting bet. The results of each of the bets will be resolved according to a particular set of rules. One or more results of the sports base game may be used as inputs to a lotto side game similar to the lotto side game described above with reference to FIG. 14. In this instance, one or more of the results in the lotto side game may be the number of the player that scored the first points in the football game or the number of the horse that won the horse race. For example, the player who scored the first points in the football game may wear the number six (6) and upon determining this result, the side game application program 313 may display the representation 1402 in the side game area 1401. The winner of the horse race may wear the number thirty six (36) and this number may form the second result of the lotto side game. Accordingly, the representation 1403 may be displayed in the side game area 1401.

The combination of the sports base game with the lotto side game allows a player to place bets on the results of a number of sporting fixtures to be played over a period (e.g., a football match, horse race and car race happening over a weekend) and play the lotto side game over that period.

The arrangements described above open up hedging opportunities to players of the base games described above.

INDUSTRIAL APPLICABILITY

It is apparent from the above that the arrangements described are applicable to the gaming, computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer implemented method of playing a wagering game comprising the steps of:

placing a base game bet on a base game and participating in said base game, results of said base game being resolved according to a first set of game rules, wherein said base game is roulette; and placing a side game bet on a side game while participating in said base game, one or more of the results of said base game being used as inputs to said side game, results of said side game being resolved based on said inputs according to a second set of game rules, wherein said side game is a virtual sports game.

2. The method of claim 1, further comprising placing another side game bet on another side game, wherein said another side game is a lotto game.

3. The method of claim 1 wherein the virtual sports game is a baseball game.

4. The method of claim 1 wherein the virtual sports game is a football game.

5. The method of claim 1 wherein the virtual sports game is a horse racing game.

6. The method of claim 1 wherein the virtual sports game is a car race game.

7. A gaming system for playing a game comprising a base game and a side game, said gaming system comprising:

a processor for controlling the play of the base game and the side game;

at least one display device connected to the processor for displaying one or more screens of the base game and the side game, wherein said base game is roulette and wherein said side game is a virtual sports game; and input means connected to the processor and the display device, for use by a player in controlling one or more aspects of the games, wherein the processor controls the base game such one or more results of the base game are used as input results of the side game.

8. The system of claim 7, wherein said at least one display device is configured to display another side game which is a lotto game.

9. The system of claim 7 wherein the virtual sports game is a baseball game.

10. The system of claim 7 wherein the virtual sports game is a football game.

11. The system of claim 7 wherein the virtual sports game is a horse racing game.

12. The system of claim 7 wherein the virtual sports game is a car race game.

* * * * *